(12) United States Patent
Ophir et al.

(10) Patent No.: US 12,726,595 B2
(45) Date of Patent: Sep. 1, 2026

(54) SYSTEM AND METHOD FOR PROVIDING SCENE INFORMATION TOGGLED BETWEEN VIRTUAL AND REAL-WORLD SCENE INFORMATION

(71) Applicant: ELBIT SYSTEMS LTD., Haifa (IL)

(72) Inventors: Yoav Ophir, Haifa (IL); Eli Rorberg, Haifa (IL); Dan Hakim, Haifa (IL)

(73) Assignee: ELBIT SYSTEMS LTD., Haifa (IL)

(*) Notice: Subject to any disclaimer, the term of this patent is extended or adjusted under 35 U.S.C. 154(b) by 164 days.

(21) Appl. No.: 18/520,991

(22) Filed: Nov. 28, 2023

(65) Prior Publication Data

US 2024/0098225 A1 Mar. 21, 2024

Related U.S. Application Data

(63) Continuation-in-part of application No. PCT/IB2022/055166, filed on Jun. 2, 2022, which is (Continued)

(51) Int. Cl.

*H04N 7/18* (2006.01)
*G02B 27/01* (2006.01)
*G06V 10/25* (2022.01)

(52) U.S. Cl.

CPC ........... *H04N 7/181* (2013.01); *G02B 27/017* (2013.01); *G06V 10/25* (2022.01); *G06V 2201/07* (2022.01); *G09G 2340/0407* (2013.01)

(58) Field of Classification Search

None

See application file for complete search history.

(56) References Cited

U.S. PATENT DOCUMENTS 4,679,077 A 7/1987 Yuasa et al.
5,138,555 A 8/1992 Albrecht
(Continued)

FOREIGN PATENT DOCUMENTS

CN 102043410 A 5/2011
CN 102339021 A 2/2012
(Continued)

OTHER PUBLICATIONS

A.N. Kokoulin et al. (2019) Hierarchical object recognition system in machine vision, J. Phys.: Conf. Ser. 1353 012054. doi: 10.1088/1742-6596/1353/1/012054.
(Continued)

*Primary Examiner* — Gelek W Topgyal
(74) *Attorney, Agent, or Firm* — S.J. INTELLECTUAL PROPERTY LTD.

(57) ABSTRACT

Aspects of embodiments pertain to a method for providing scene related information from a scene to a remote station. The method may comprise receiving, at the remote station, a data object in relation to at least one identified attribute of one or more physical objects located in an ROI of the scene acquired by at least one sensor. A priority level value (PLV) is associated with the data object. The method may further include generating, at the remote station, using local station data, a low-latency virtual representation of the scene for displaying, at the remote station, a scene representation comprising the low-latency scene representation and a visualization of the received data object. In addition, real-world scene data descriptive of real world ROI/Target information may be receive. A user may designate an ROI/Target of the data object visualization for displaying real world ROI/Target information relating to the designated ROI/Target.

17 Claims, 18 Drawing Sheets

Related U.S. Application Data a continuation-in-part of application No. PCT/IB2021/054873, filed on Jun. 3, 2021.

(56) References Cited

U.S. PATENT DOCUMENTS

| | | | | |
|---|---|---|---|---|
| 5,904,724 | A | 5/1999 | Margolin | |
| 6,476,802 | B1 | 11/2002 | Rose et al. | |
| 6,591,190 | B2 | 7/2003 | Nishida et al. | |
| 9,619,916 | B2 | 4/2017 | Steinke | |
| 9,881,419 | B1 | 1/2018 | Cote et al. | |
| 10,185,628 | B1 | 1/2019 | Snyder et al. | |
| 10,726,633 | B2 * | 7/2020 | Deng | H04N 7/157 |
| 2004/0194129 | A1 | 9/2004 | Carlbom et al. | |
| 2010/0013931 | A1 | 1/2010 | Golan et al. | |
| 2010/0153987 | A1 | 6/2010 | Paskins | |
| 2012/0019522 | A1 | 1/2012 | Lawrence et al. | |
| 2012/0179742 | A1 | 7/2012 | Acharya et al. | |
| 2012/0287284 | A1 | 11/2012 | Jacobsen et al. | |
| 2012/0319928 | A1 | 12/2012 | Rhodes | |
| 2013/0182902 | A1 | 7/2013 | Holz | |
| 2014/0064626 | A1 * | 3/2014 | Chon | G06V 30/2504 382/209 |
| 2014/0085314 | A1 | 3/2014 | Steinke | |
| 2014/0192048 | A1 | 7/2014 | Johansson et al. | |
| 2014/0300597 | A1 | 10/2014 | Holcomb | |
| 2014/0324249 | A1 | 10/2014 | Lacaze et al. | |
| 2015/0084951 | A1 | 3/2015 | Boivin et al. | |
| 2016/0005234 | A1 | 1/2016 | Boivin et al. | |
| 2016/0133230 | A1 | 5/2016 | Daniels et al. | |
| 2016/0148431 | A1 * | 5/2016 | Seydoux | A63G 31/16 345/633 |
| 2016/0378861 | A1 | 12/2016 | Eledath et al. | |
| 2017/0134631 | A1 | 5/2017 | Zhao et al. | |
| 2017/0138732 | A1 | 5/2017 | Pettersson et al. | |
| 2017/0148340 | A1 | 5/2017 | Popa-Simil et al. | |
| 2017/0247108 | A1 | 8/2017 | Ljubuncic et al. | |
| 2017/0251176 | A1 | 8/2017 | Smolyanskiy et al. | |
| 2017/0372137 | A1 | 12/2017 | Kumar et al. | |
| 2019/0065895 | A1 | 2/2019 | Wang et al. | |
| 2019/0206141 | A1 * | 7/2019 | Deng | G06F 3/011 |
| 2020/0310416 | A1 | 10/2020 | Matsunaga et al. | |
| 2020/0348665 | A1 | 11/2020 | Bhanushali et al. | |
| 2022/0147751 | A1 * | 5/2022 | Vitek | G06V 10/82 |

FOREIGN PATENT DOCUMENTS

| | | | |
|---|---|---|---|
| CN | 104111658 | A | 10/2014 |
| CN | 204426845 | U | 7/2015 |
| CN | 204669545 | U | 9/2015 |
| CN | 204833674 | U | 12/2015 |
| CN | 205210690 | U | 5/2016 |
| CN | 105828062 | A | 8/2016 |
| CN | 106341667 | A | 1/2017 |
| EP | 3419284 | A1 | 12/2018 |
| EP | 3702864 | A1 | 9/2020 |
| WO | 2016077493 | A1 | 5/2016 |
| WO | 2017190351 | A1 | 11/2017 |
| WO | 2018032457 | A1 | 2/2018 |
| WO | 2019128229 | A1 | 7/2019 |

OTHER PUBLICATIONS

PCT International Preliminary Report on Patentability for International Application No. PCT/IB2021/054873, mailed on Dec. 6, 2022, 8 pages.

PCT International Preliminary Report on Patentability for International Application No. PCT/IB2022/055166, mailed on Dec. 14, 2023, 14 pages.

PCT International Search Report and Written Opinion for Application No. PCT/IB2021/054873, mailed Jul. 23, 2021, 10 pages.

PCT International Search Report and Written Opinion for International Application No. PCT/IB2022/055166, mailed Sep. 15, 2022, 14 pages.

Israel Examiner Interview summary for Patent Application No. 288889 dated Jul. 16, 2023, 2 pages.

Israel Office Action and search report mailed on Sep. 2, 2020 in P10769-IL (real-time remote vision).

Israel Office Action for Patent Application No. 288889 dated May 4, 2022, 10 pages—English Translation Available.

Israel Office Action for Patent Application No. 288889 dated Sep. 13, 2022, 4 pages.

Israel Office Action mailed on Oct. 5, 2021 in P10769-IL IL275163 (Real-time 3D remote vision).

Israel Office Action mailed on Jan. 7, 2021 in P10769-IL IL275163 (Real-time 3D remote vision).

Non-Final Office Action mailed Feb. 8, 2024 for U.S. Appl. No. 18/070,856, filed Nov. 29, 2022, 37 pages.

Non-Final Office Action mailed Mar. 29, 2023 on for U.S. Appl. No. 18/070,856, filed Nov. 29, 2022, 27 pages.

Non-Final Office Action mailed on Aug. 29, 2023 on for U.S. Appl. No. 18/070,856, filed Nov. 29, 2022, 37 pages.

P10769-IL Partial translation of Examiner Interview Jan. 23, 2021 IL 275163.

U.S. Appl. No. 18/070,856, Advisory Action dated Dec. 5, 2023, 3 pages.

Communication pursuant to Article 94(3) EPC for European Application No. EP21732984, mailed on Jan. 22, 2025, 4 pages.

Communication pursuant to Article 94(3) EPC for European Application No. EP22815472, mailed on Jan. 22, 2025, 4 pages.

Final Office Action mailed Jun. 24, 2024 on for U.S. Appl. No. 18/070,856 filed Nov. 29, 2022, 30 pages.

Non Final Office Action mailed Nov. 14, 2024 on for U.S. Appl. No. 18/070,856 filed Nov. 29, 2022, 22 pages.

European Patent Office, European Search Report and Opinion for EP application 22815472 and invitation to comment mailed Feb. 23, 2024, 14pp.

Israel Patent Office, Notice before Refusal mailed Feb. 25, 2024 for IL application 288889, 6pp.

* cited by examiner

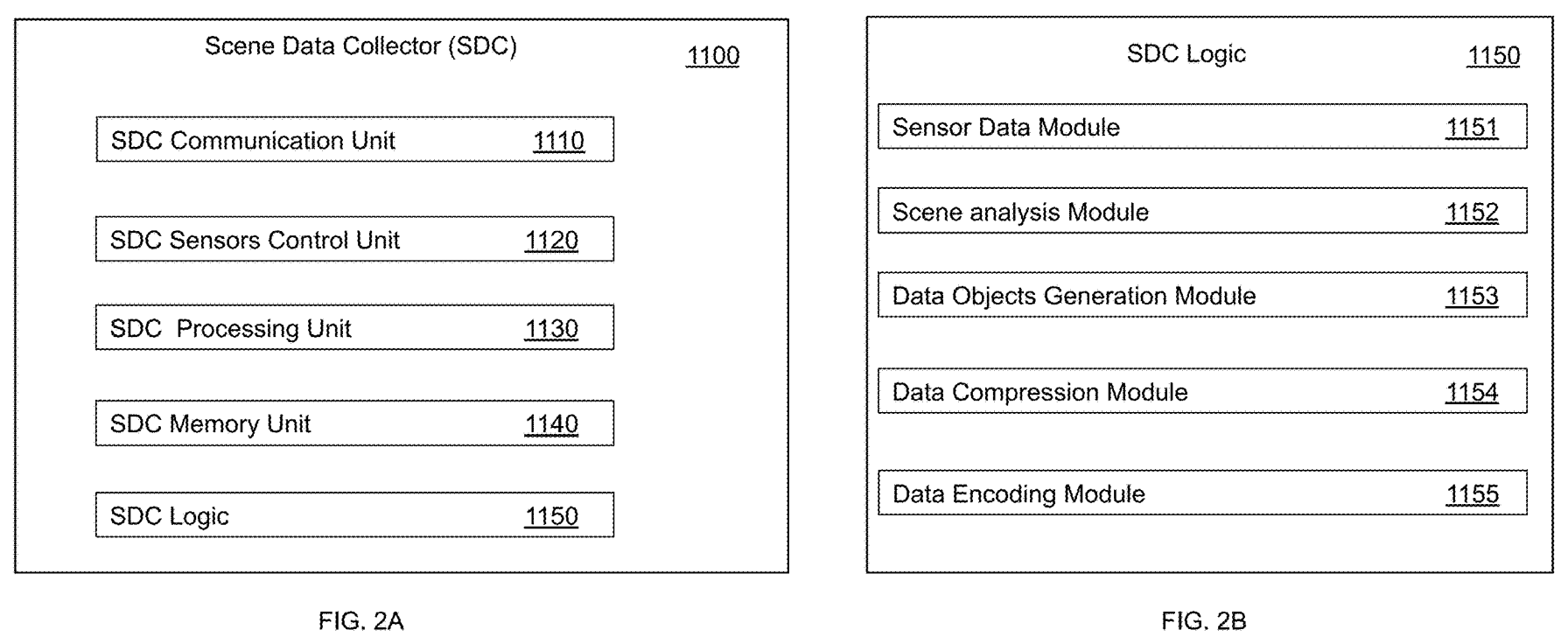

Scene Data Collector (SDC) 1100

SDC Communication Unit 1110

SDC Sensors Control Unit 1120

SDC Processing Unit 1130

SDC Memory Unit 1140

SDC Logic 1150

FIG. 2A

SDC Logic 1150

Sensor Data Module 1151

Scene analysis Module 1152

Data Objects Generation Module 1153

Data Compression Module 1154

Data Encoding Module 1155

FIG. 2B

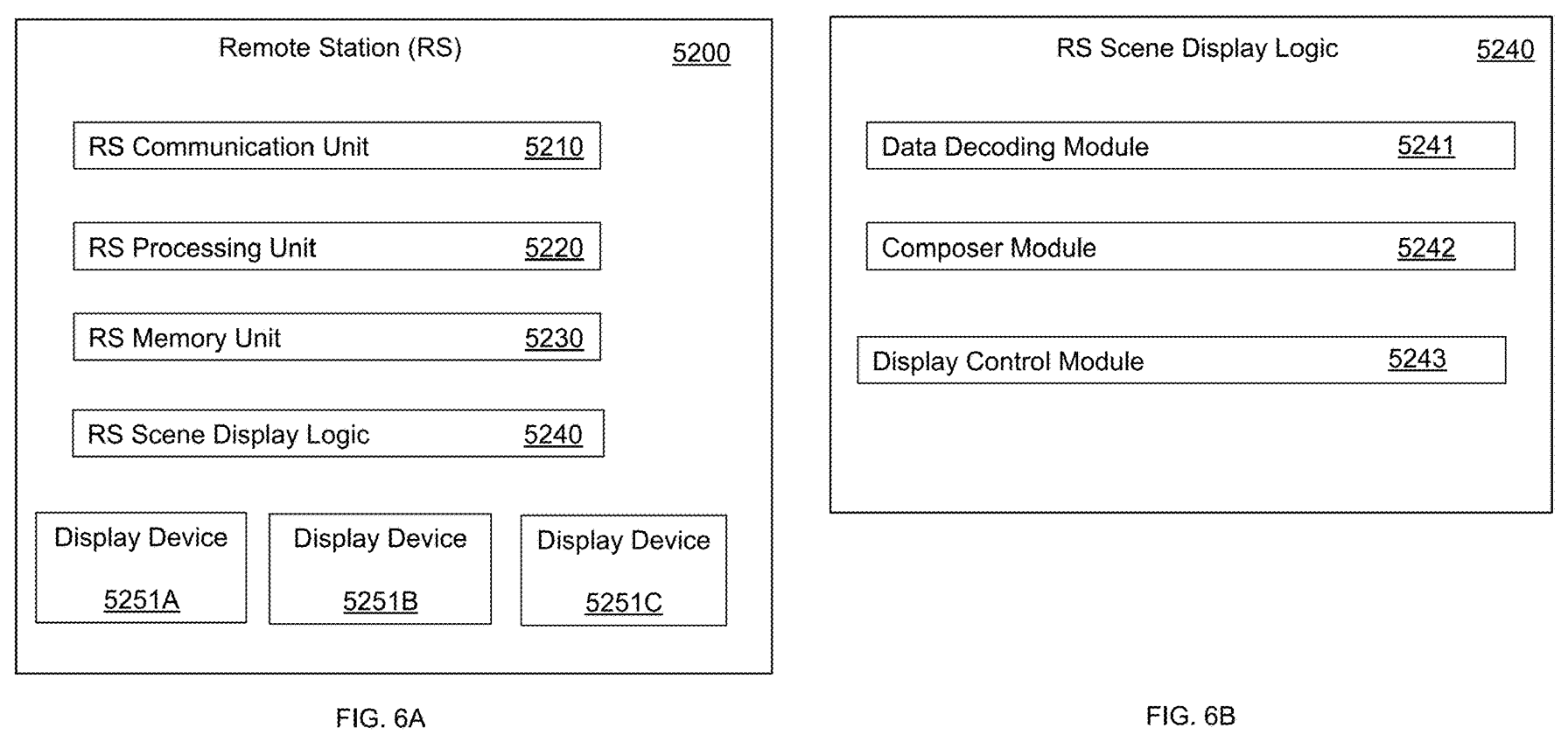

RS Scene Display Logic 5240

Data Decoding Module 5241

Composer Module 5242

Display Control Module 5243

FIG. 6B

Remote Station (RS) 5200

RS Communication Unit 5210

RS Processing Unit 5220

RS Memory Unit 5230

RS Scene Display Logic 5240

Display Device 5251A

Display Device 5251B

Display Device 5251C

FIG. 6A

@time(real)=t0, control input command is provided
acceleration(real)=0
velocity(real)=0
Position(real)=P0
Real Scene 15000
4300real

SYSTEM AND METHOD FOR PROVIDING SCENE INFORMATION TOGGLED BETWEEN VIRTUAL AND REAL-WORLD SCENE INFORMATION

CROSS-REFERENCE TO RELATED APPLICATIONS

This application is continuation of International Patent Application PCT/IB2021/054873, filed 3 Jun. 2021, titled "SYSTEM AND METHOD FOR PROVIDING SCENE INFORMATION"; and from Israel patent application 288889, filed 8 Dec. 2021, titled "SYSTEM AND METHOD FOR PROVIDING SCENE INFORMATION". The contents of the above applications are all incorporated by reference as if fully set forth herein in their entirety.

BACKGROUND

Systems and devices for acquiring and presenting scene related information require the use of one or more sensors such as video cameras and audio recording devices, to acquire scene related information from a region of interest (ROI) and presentation means such as screens and audio output devices, for presenting the acquired data. These systems can be used for a variety of purposes, such as for monitoring and surveilling purposes, in gaming applications, and the like. The viewer is often located remotely from the ROI requiring transmission of the acquired data through communication means of the system, for presenting or additional processing of the scene information in a remotely located unit.

These systems are limited to the transmission properties of the communication means such as communication bandwidth limitations, relay limitations, data packaging definitions and the like.

The description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 2A is a block diagram of a scene data collector, according to some embodiments.

FIG. 2B is a block diagram of a scene control logic of the scene data collector, according to some embodiments.

FIG. 6A shows a structure of a remote station, according to some embodiments.

FIG. 6B shows an optional structure of a remote station scene presentation logic, according to some embodiments.

DETAILED DESCRIPTION

Figure 1:
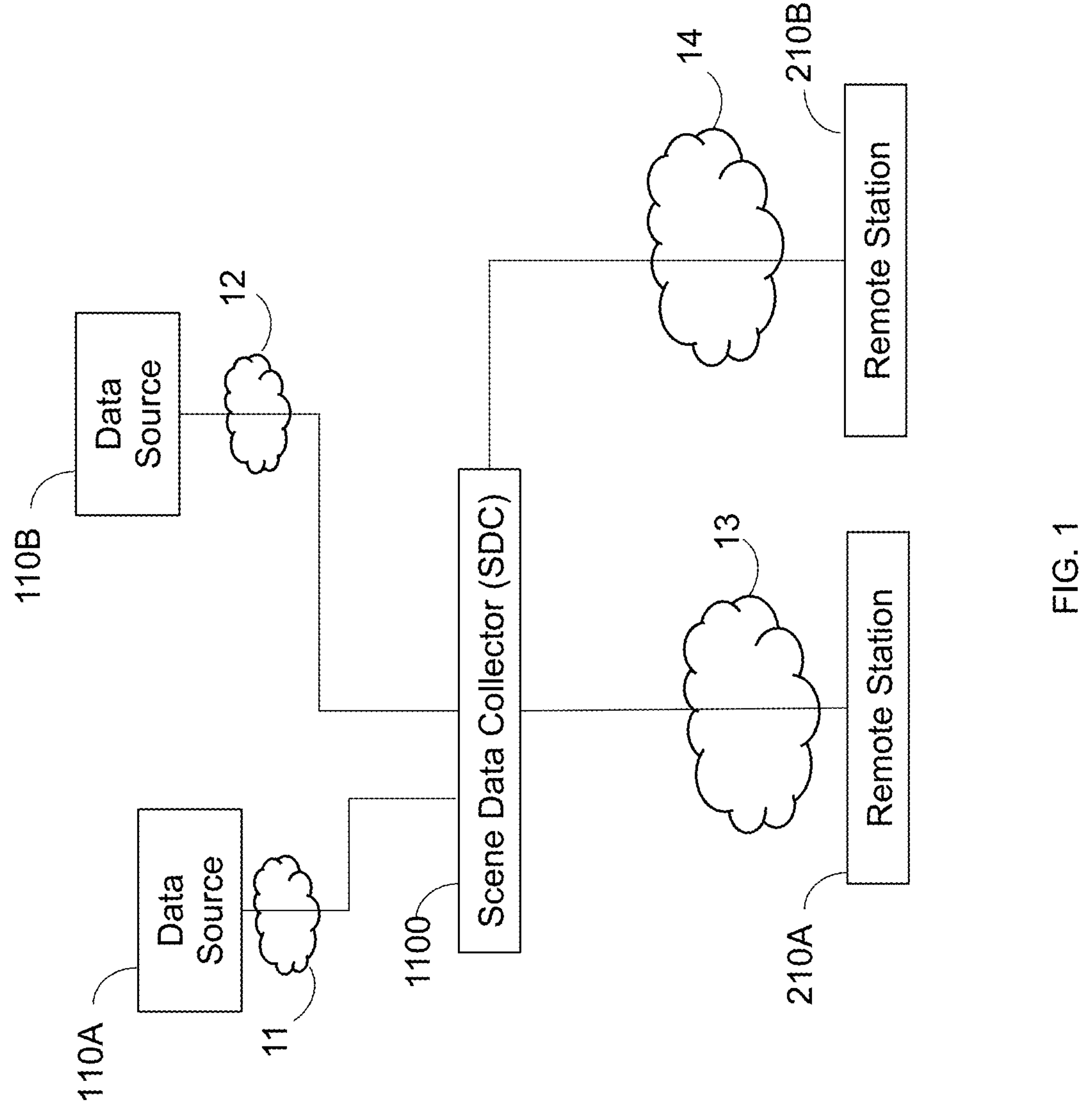
FIG. 1 is a block diagram of a scene information system having a scene data collector, according to some embodiments.

Aspects of disclosed embodiments pertain to systems, devices and/or methods for providing scene related information to one or more remotely located stations. The scene information may be representative of one or more physical objects in the scene occurring in a region of interest (ROI).

The systems and methods disclosed may be used for real time (RT) or near RT and/or frequent updatable remote tracking, monitoring and/or surveilling of physical objects that are of interest in one or more scenes occurring in one or more ROIs, while being able to use narrow band and/or low transmission rates based communication between subsystems or devices located at the ROI(s) and the remote station(s), by reducing the overall data size of the acquired scene information based on one or more criteria or rules such as based one or more attributes such as prioritization level value of the physical objects identified in the ROI.

It is noted that the term "method" may also encompass the meaning of the term "process".

According to some embodiments, scene source data (also: real-world scene data) including scene related information acquired by one or more data sources such as one or more sensors (e.g., camera(s), three dimensional (3D) sensor(s), positioning sensor(s), etc.) may be received and processed to identify one or more physical objects in the scene and determine their attributes (e.g., object identity, object's physical characteristics, object type, object prioritization level value (PLV), etc. The physical objects' identification and determination of attributes of the objects, may then be used for generating data objects, where each data object is associated with a single identified physical object. The generation of each data object may be based on the respective physical object's determined attributes.

According to some embodiment an object type attribute may indicate the physical object's representing noun (tree, man, car, sky, building), details thereof (three store building, tree type, male/female, etc.), and/or a code indicative thereof.

According to some embodiments, an object identity attribute may be indicative of the specific details of the physical object (identification details of a person physical object such as name, ID number, age etc., vehicle licensing number, owner etc.).

According to some embodiments, physical characteristics attributes of a physical object may include, for example, one or more of: color, height, geometrical dimensions and/or contours, surfaces texture(s) (e.g., using texture atlas mapping), chemical composition, thermal readings of surfaces or indication of average temperature of the surface, etc.

According to some embodiments, the generated data objects of the respective scene and ROI, associated with a specific scene time, which may be the time in which the scene source data was acquired, may be transmitted to one or more remote stations, remotely located from the ROI of the respective scene. Each remote station may be configured to receive the one or more data objects for each scene and scene time, and process the received data objects, for generating a virtual scene data, based thereon, for displaying of the virtual scene data to one or more viewers.

The data objects may be of a substantially reduced data size relative to the data size of the scene source data e.g., for enabling: (a) real time (RT) or near RT (NRT) display of their associated virtual scene data (in respect to the time of receiving of the scene source data); (b) for visually displaying visual data indicative mainly of physical objects of the scene that are of interest and/or only important/relevant attributes thereof. In some embodiments, the data sources may include one or more sensors for sensing one or more physical characteristics of the scene such as for sensing: visual data (e.g., using video camera(s) and/or using 3D sensor(s), infrared (IR) camera(s) or detectors, etc.); auditory data (e.g., using one or more microphones); positioning data; environmental data (e.g., by using thermal sensors) and the like.

According to some embodiments, a designated scene data collector (SDC) may be used for receiving the scene source data, identification of the physical objects in the scene, determination of their attributes, generation of the data objects, based thereon, and transmission of the data objects of the respective scene to the one or more remote stations.

According to some embodiments, a user may designate or select at least one object of interest of a plurality of objects located in the scene, e.g., via the one or more remote stations.

According to some embodiments, a user may designate at least one ROI of the scene, e.g., via the one or more remote stations.

According to some embodiments, a user may select at least one ROI to select thereby a plurality of objects located in the ROI as objects of interest, e.g., via the one or more remote stations.

According to some embodiments, the system (e.g., the SDC) may be configured to allow designation or selection at least one object of interest of a plurality of objects located in the scene, e.g., via the one or more remote stations.

According to some embodiments, the system (e.g., the SDC) may be configured to allow designation at least one ROI of the scene, e.g., via the one or more remote stations.

According to some embodiments, the system (e.g., the SDC) may be configured to allow selection of at least one ROI to select thereby a plurality of objects located in the ROI as objects of interest, e.g., via the one or more remote stations.

According to some embodiments, the system (e.g., the SDC) may be configured to automatically designate or select at least one object of interest of a plurality of objects located in the scene.

According to some embodiments, the system (e.g., the SDC) may be configured to automatically select or designate at least one ROI of the scene.

According to some embodiments, the system (e.g., the SDC) may be configured to automatically select or designate at least one ROI to select thereby a plurality of objects located in the ROI as objects of interest.

The selection or designation of the at least one ROI and/or object of interest may be performed for remote scene monitoring or surveillance purposes of, for example, persons, publicly accessible areas, private areas, and/or restricted access objects. In some examples, a restricted access object may be a person whose privacy may be intentionally compromised by the system's monitoring activity without the person's knowledge, and/or any object located, for example, in a publicly accessible or private areas.

The system may monitor the scene without knowledge of persons located in the scene and/or without knowledge of persons responsible for restricted access objects and/or without alerting security systems employed to enforce policies with respect to restricted access objects.

In some examples, a restricted access object may be subject to privacy policies and/or security policies defined, for example, by rules and/or settings which, when enforced, protect a person's privacy, protect sensitive data and/or resources from exposure, and/or the like, to unauthorized third parties (e.g., other persons, systems).

In some embodiments, the system configuration enables partial or full control (e.g., by the user) over the PLVs or attributes to be associated to physical objects. Accordingly, the system enables partial or full control, e.g., of the SDC or the system user, over the virtual scene data generated (and optionally displayed) at the remote station. In some embodiments, persons that are located in the scene do not have control over the attributes and/or PLVs associated by the system (e.g., the SDCs) to (e.g., any of the) physical objects located in the scene. Accordingly, in some embodiments, persons located in the scene do not have control over virtual scene data generated (and optionally displayed) at the remote station, e.g., to the user.

In some embodiments, the system may be configured to enable defining, by at least one user located at the at least one remote station, a prioritization level value and/or attribute for the at least physical object.

In some embodiments, method may include defining by at least one user located at the at least one remote station, a prioritization level value and/or attribute for the at least physical object.

The SDC may include any hardware, device(s), machines and/or software modules and/or units configured at least for data communication and processing. In some examples, the SDC may be located in the scene.

According to some embodiments, one or more of the data sources (e.g., one or more sensors) may be carried by and/or embedded in the SDC.

According to some embodiments, the remote station may be further configured to remotely control any one or more of:

The one or more sensors;

The SDC;

A remotely controllable carrier platform (such as a vehicle or a movable robot), configured for carrying the SDC and/or the sensors;

Other additional operational devices such as tracking and/or intercepting devices, weapon devices, targeting devices, illumination devices, etc.

According to some embodiments, the data object of each identified physical object in the scene may include one or more of:

one or more attributes of the respective identified physical object;

data portions from the scene source data that are associated with the respective identified physical object; and/or one or more modified data portions from the scene source data that are associated with the respective identified physical object.

According to some embodiments, each data object may include one or more of the above optional data classifications (attributes, data portions from the scene source data and/or modified data portions). To determine which data classification(s) will represent each identified physical object and thereby be included in its respective data object, the system (e.g., the SDC) may be configured to determine (e.g., assign) a PLV to each identified physical object and/or to one or more attributes thereof, and determine whether its respective data object will include more detailed representation of the respective physical object (e.g., by including the scene source data's high resolution data portion(s) indicative of the specific physical object), based on its PLV. For example, data objects of physical objects regarded as high priority objects (e.g., more important for tracking) may include more information (e.g., modified or non-modified data portions from the scene source data associated therewith and/or more attributes thereof) and therefor may be of a larger data size than data objects of physical objects assigned with lower PLV.

The assignment of PLV to each identified object and/or attributes thereof may be carried out based on one or more PLV assignment criteria.

According to some embodiments, each data object may also be associated with a transmission rate, based on its respective PLV. For example, data objects of physical objects that are assigned with PLVs lower than a PLV minimum threshold may be transmitted at a lower transmission rate than data objects of physical object assigned with PLVs higher than the PLV minimum threshold. This may enable updating information associated with physical objects in the scene that are of lower priority (e.g., less interesting) at a low updating rate (as well as at low data size) than information associated with physical objects that are of higher interest (higher priority).

According to some embodiments, the determination of attributes for each physical object, such as the physical object's PLV, physical characteristics, etc., may be carried out in RT or near RT, in respect to the time of receiving of the scene source data. For example, the PLV assignment to physical objects may be changed over time, based on PLV assignment criteria. For example, a physical object may be assigned with low PLV when not in movement (where its movement parameters values are part of the physical characteristics attributes of the object), where the PLV increases when movement of this physical object is detected and decreases when the physical object does not move. Optionally other additional one or more attributes of the specific physical object (e.g., object type, identity etc.) may influence the decision-making process for PLV assignment.

According to some embodiments, the assignment criteria may be based on the one or more attributes of each identified physical object. For example, an assignment criterion may be based on the identity of an individual physical object, where the individual's identity may be the attribute of a visual data portion including visual data of the individual in the scene source information. The identity of the individual may determine the PLV thereof, where the criteria assigns high PLVs to human individuals in the scene and low PLV to background or scenery physical objects such as a building or a tree.

The term "data source" used herein refers to any device, sensor, detector, system, memory unit operable to, sense, detect, store, transmit and/or generate data descriptive of information.

The term "data" may relate to and/or be descriptive of any digitally or electronically storable and/or transmittable information, such as, for example, data files, data signals, data packages, and/or the like.

The terms "station", "remote station", and/or "remotely located station" may relate to any one or more computer-based systems, devices, hardware modules/units, software modules/units, display devices, sensors, detectors, or a combination of any two or more thereof.

According to some embodiments, a data source may be one or more sensors outputting raw sensor data; a data generator configured to generate virtual and/or augmented scene data; a combination of a data generator and one or more sensors; a data source configured to receive raw senor data from one or more sensors and process this received data to generate the scene source data; and/or any other information source that can produce and transmit scene-related information.

The sensors may include any type of device configured for sensing one or more physical characteristics of scenes in the ROI such as, for example: two dimensional (2D) visual sensors such as, for example, video cameras, still cameras, thermal camera(s), and/or three dimensional (3D) visual sensors; audio sensors such as for example microphones (e.g., single and/or stereo, directional or non-directional); environmental sensors such as for example chemical materials detectors, wind velocity and/or speed sensors, temperature, light and/or humidity sensors; sensors and/or other devices for identification of biometric properties such as, for example, gait sensors, facial recognition detectors and/or systems; and/or the like; positioning devices such as, for example, space-based global navigation satellite system (GNSS), including, for example, a Global Positioning System (GPS) and/or the Global Navigation Satellite System (GLONASS); etc.

The sensors may be configured for real time (RT) or near RT sensing and sensor data transmission, processing and/or for data recording and storage. At least some of the sensor operating characteristics may be configurable and/or controllable from afar. Configurable sensor operating parameters may include, for example, positioning parameters (e.g., roll, pitch and/or yaw relative to, for example, a world or other frame, gimbal adjustment, and/or the like), output data resolution parameters, data transmission parameters, scene illumination parameters, sound detection parameters, and/or the like. In some embodiments the sensor operating parameters that can be adaptively adjusted may include, for example, a frame rate of a video stream; a video compression rate and/or type; an image compression rate and/or type; a field of view (FOV) adjustment; a depth of field adjustment; a ROI selection, for example, by an operating zooming module (e.g., zoom mechanism and/or digital zoom) of the sensors; an audio frequency and/or amplitude adjustment, and/or the like. The adjustment of the sensors is adaptive by responding in an ongoing manner, to the acquired scene data and/or to incoming adjustment commands delivered manually or automatically.

In some embodiments, one or more of the sensors may be mobile or embedded in a mobile device and optionally remotely controlled by a user via the at least one remote station or automatically or autonomously movable, such as, for example, one or more visual and/or positioning devices attached to or embedded in one or more drones and/or mobile manned or unmanned vehicles; sensors such as, for example, video camera and microphones embedded in mobile communication devices such as, for example, mobile smartphones, tablet devices, etc. These mobile vehicles and/or devices also include communication module and optionally also data storage module, such as, for example, transducers and memory units, allowing transmission and storage of sensors' acquired data.

In some embodiments, the one or more data sources may include one or more servers storing static scene information, and/or hybrid static and real-time information of the scene.

According to some embodiments, each identified physical object may be assigned with a PLV, according to one or more PLV assignment criteria based on the one or more attributes of the respective identified physical object, and/or by having a human user, manually assign a PLV for each physical object. The PLV of each physical object, as mentioned above, may be updated on occasions and/or in RT or NRT.

According to some embodiments, the PLV of a (e.g., each) physical object may be taken, for instance, from a priorities scale, which may include two or more optional PLVs. A PLV of a PLV scale may be a static PLV, a dynamically selected PLV or an adaptively selected PLV. Static PLVs may be predetermined and remain constant. Dynamic PLVs are forcefully changed, for example, at a certain time of day, or a certain day of the year. Adaptive PLVs are changed, for example, in response to changes in characteristics of the system and/or the scene and may vary depending on a variety of parameters. Optionally, characteristics of a PLV scale may be static, dynamic and/or adaptive characteristics. According to some embodiments, a PLV may be defined (e.g., selected), by the user of the system via the at least one remote station. According to some embodiments, a PLV may be defined by a user (e.g., selected) by a user that is located in the scene, e.g., via station that is located in the scene (e.g., via a mobile device that is associated with the on-site user).

According to some embodiments, the priorities scale can be a scale of two or more integer values (e.g., a scale of integers from a minimum PLV to a maximum PLV); distinct tags (e.g., low, medium or high etc.); or alternatively a non-integer scaling stretching from a predefined minimum PLV i.e. PLV_MIN to a predefined maximum PL V i.e. PLV_MAX. The minimum and maximum values of the PLV may be adjustable or adaptive depending for instance, on the acquired data quality (e.g., resolution, noise, etc.), changes identified in the ROI or scene and/or the like.

According to some embodiments, the identification of physical objects from the scene source data may be carried out automatically, by, for example, performing one or more of the following: detecting visual changes between consecutive received scene source data (e.g., changes between consecutive video frames); identifying visual images of physical objects in visual scene source data portions using a designated image analysis process such as, for example, a frame by frame analysis and comparison; identifying sound sources in auditory portions in the scene source data e.g., using an audio analysis process (such as speech detection audio analysis); detecting motion of objects by detection of changes in consecutive scene source data; and/or detecting objects' identity via biometric data analysis.

In some embodiments, the determining of one or more attributes for each identified physical object, may be carried out by analyzing the content of one or more portions from the scene source data that are associated with the respective physical object. For example, for determining the identity of the physical object, its object type and/or any other attribute(s). The analysis for defining and/or identifying each attribute of each physical object may include, for instance, image analysis that includes biometric detection and identification (e.g., by using facial and/or other physical characteristics recognition and comparison with corresponding physical characteristics of known individuals) and/or vehicle identity identification by automatic visual characteristics identification (e.g., by using automatic visual identification of vehicle license number and/or other visual vehicle characteristics and comparing thereof with known vehicles etc.), e.g., by using one or more known objects attributes databases.

In some examples, the positioning sensor(s) (e.g., GPS based sensor(s)) can be used for adding attributes to identified physical objects. For example, adding 3D positioning coordinates to 2D or 3D image/model data attributes of a physical object, acquired by several sensors. In some embodiments, the positioning sensor(s) data can also be used for determining exact real locations of physical objects.

In some embodiments, the physical objects in the scene may be identified by having a human user, using a designated user interface (UI) at the remote station, defining the data portions of each or some of the physical objects in the scene optionally as an initial process, (e.g., displaying sensor data directly from the scene and manually marking of images contours of objects) and optionally also assigning attributes to the identified physical objects, such as, for example, the PLVs thereof.

According to some embodiments, the remote station (RS) may be configured to receive data objects of identified physical objects in a ROI, in RT or near RT, in respect to the time of generating the data objects, and retrieve additional data and/or use data processing modules, in order to build, in RT or near RT, a 2D or 3D virtual scene data of the scene, based on the data objects. For example, if only attributes of a physical object such as object type, positioning, identity and its PLV is included or indicated in the specific data object of a respective identified physical object, the RS may process these data objects to build 3D scene, where each of the identified physical objects associated with the data objects may be represented by a virtual 3D image, selected from a database or built based on the attributes of the physical object. For example, if the physical object is a specific vehicle of a specific vehicle type, and only its identity and location attributes are received, the RS may be configured to retrieve a 2D or 3D image or model of the specific vehicle type from a database, retrieve landscape/background visual representation of the location of the scene (e.g., from previously acquired information or retrieved from general maps or atlases), for creating a virtual ROI and/or scene display and integrate the display of the generated or retrieved 2D or 3D image or model of the vehicle in the right positioning in the virtual ROI.

According to some embodiments, if the PLV of the physical object, indicated in the data object thereof, is low (e.g., lower than a predefined minimum PLV threshold) the representation of the physical object in the virtual scene data may be much less detailed than a representation of a physical object assigned with a higher PLV.

The process of physical objects identification, their attributes determination and generation of data objects based thereon may optionally also include a mode selection process. For example, the mode selection process enables selection between a recording and RT/near RT transmission modes, where in the recording mode the scene source data is recorded (e.g., stored to a memory unit) and not transmitted or transmitted at a low transmission rate to the remote station; and in the RT/near RT transmission mode the scene source data is processed to form and transmit the data objects to the remote station at a significantly higher transmission rate. To automatically determine the selected mode, the mode selection process may include identification of an alarming situation and switch to a RT or near RT transmission mode only when an alarming situation is identified. Where in an alarming situation, an alert signal or information may also be transmitted to the RS along with the display scene data.

The mode selection process may in some embodiments include transmission bandwidth selection (e.g., depending on communication bandwidth abilities of the system) by switching to a wider bandwidth options upon identification of an alarming situation and/or the like.

In some embodiments, the mode selection includes using a "sleep mode" in which the scene source data is transmitted to the remote station at a low resolution (e.g., low definition (LD) mode) and/or low transmission rate mode and/or no transmission recording mode until an alarming situation is detected (e.g., until at least one of the identified physical objects is assigned with a PLV higher than a predefined minimum PLV threshold). Once an alarming situation is detected, the transmission mode will switch to non-sleep mode or "alert mode" in which the process of data objects' generation can be initiated.

Additionally or alternatively the display of the virtual scene data may be operated in a low resolution display until an alarming situation is detected. Once an alarming situation is detected, the display switches to an "alert mode" displaying the virtual scene data in its highest display resolution (e.g., high definition (HD)).

In some embodiments, the data objects may be encoded for security purposes, using one or more predefined encoding methods, modules and/or programs. Respectively, the RS should have a corresponding decoding program or module for decoding encoded data objects.

According to some embodiments there is further provided a scene monitoring system (also referred to herein as "the system") for providing scene related information. The scene monitoring system includes at least a scene data collector (SDC) configured for receiving scene source data from one or more data sources and optionally information from other sources indicative of physical characteristics of a scene occurring in a ROI, and process the received scene source data at least for identifying physical objects in the ROI, determining one or more attributes thereof and generating data objects, based on the attributes of the identified physical objects. The SDC may also include communication module for transmitting generated data objects at least to one or more remote stations, where one or more of the remote stations may also be part of the scene monitoring system.

The SDC can be fully automatically operated and/or operated at least partially remotely by a human user.

The SDC may be physically located in or near the ROI, in which scenes occur or remotely therefrom.

The SDC may be implemented as one or more software and/or hardware units or a combination thereof such as, for example, at least one computerized device, computer-based system, digital board or chip, electronic circuitry, or any other one or more hardware units configured for data processing and communication optional running one or more designated software tools and programs for implementing the above-described processing options.

The SDC may include a communication unit, which may enable communication via one or more communication networks (herein "links" or "communication links") and may be configured to use one or more communication technologies, formats and techniques; and a processing unit for processing the received scene source data for physical objects identification, their attributes determination and data objects generation.

For example, the SDC may be implemented as a device or subsystem embedded in or carried by a carrier platform, such as a remotely controllable unmanned or manned vehicle (e.g., car, drone, etc.), a manned road vehicle, a driven robot, and/or the like that can be either remotely controlled by a user at the one or more remote station, automatically and/or autonomously driven, or driven by a human operator located at the SDC. In this case, the SDC can be moved for changing the ROI at will e.g., for tracking moving physical objects and/or relocating for improving sensor positioning or illumination or sound conditions and/or the like.

In other cases, the SDC may be held by a stationary carrier located within the ROI or in proximity thereto and optionally remotely controlled by remotely controlling (from the remote station) sensor carried thereby or embedded therein or by controlling processing and/or communication definitions and/or programs, for example, by having a user located at the remote station send control command to the SDC.

According to some embodiments, in which one or more sensors are used as data sources, at least one of those sensors may be embedded or positioned in the SDC. In some embodiments, one or more of the sensors serving as one or more data sources may be external to the scene monitoring system and optionally even part of the ROI in which the scene occurs, or part of physical objects therein. For example, the SDC may be configured for extracting data from cameras and/or microphones, where those sensors are embedded in mobile phones of human objects located at the ROI and/or located in vehicles that are physical objects in the ROI, where those cameras and/or microphones are not part of the scene monitoring system.

The scene monitoring system may additionally include one or more remote sites comprising, for example, platform, device and/or system that are remotely located from the SDC. Optionally, the remote site may also comprise one or more data sources.

In some embodiments, in which the data sources include one or more sensors for sensing physical characteristics of the scene located at the ROI, the SDC may be configured to directly receive raw sensors' data outputted by the one or more sensors and combine or process the received raw sensors data to generate the scene source data therefrom.

For example, the SDC may be configured to receive raw data (e.g., acquired within the same acquisition time span) from several sensors such as from an array of 2D video cameras, 3D sensor(s), a GPS based device, one or more environmental sensors and/or audio sensor(s). The raw data of all these sensors may be transmitted by the sensors to the SDC (e.g., in RT or near RT) where the SDC may process this raw data to form a scene source data. The visual information may in the sensors' output data be combined per data portion into a 3D data added with additional information from 2D cameras, the GPS positioning information and/or the audio information associated therewith.

The SDC may be configured for RT or near RT data communication with the one or more RPs and/or for data recording and storage and off RT data communication.

The SDC may be programmed such as, for example, to have several (e.g., predefined or adaptively changing) processing programs or rules sets, each rules set or program being associated with one or more known communication link definitions of one or more remote station, e.g., using one or more databases structured to allow such association. Once the SDC receives the communication link identification (ID) information (herein "link ID") from the remote station the SDC will execute the modification process that is specifically associated with the link ID.

According to some embodiments, the link ID may include one or more identifying indicators. For instance, each link ID may include the communication technology indicator and a bandwidth limitation indicator. The database memorizing all system's known link IDs may be configured such that each full link ID is associated with its corresponding modification rules (also: a modification logic)). Once the SDC receives the specific link ID of the remote station, it can then select the program or rules set from that database that is associated with the received link ID.

According to other aspects, there is provided a scene monitoring system that includes at least one SDC as described above and one or more remotely located remote stations (RSs). One or more of the RSs may include a RS communication unit for receiving display scene data from one or more SDCs and optionally also for receiving of data via one or more communication links, a RS processing unit for generating the virtual display data, based on received data objects' information and optionally also based on retrieved additional information, and one or more display modules for displaying the generated visual display data.

The term "communication module" used herein refers to any one or more systems or devices configured for data receiving and transmission via any one or more communication technologies and formats.

The term "display module" used herein, refers to any one or more devices or systems enabling any type of data outputting such as, for example, visual presentation devices or systems such as, for example, computer screen(s), head mounted display (HMD) device(s), first person view (FPV) display device(s) and/or audio output device(s) such as, for example, speaker(s) and/or earphones.

According to some embodiments of the scene monitoring system, the RS may also be configured for enabling remote controlling of the SDC, one or more operational devices and/or of the one or more sensors from which the scene source data originates. According to these embodiments, the sensors and/or the SDC may have remote controlling and/or adjustment abilities as well as long distance communication abilities.

In some embodiments, the SDC may also serve as a relay station for controlling/adjusting the sensors via the RPS by receiving sensors adjustment information from the RS and transmitting it to the sensors.

In some examples, the RS is also configured for retrieving and presenting additional information over the presented display scene data such as, for example, retrieving a 2D or 3D map of the ROI of the scene, adjusting the map scaling to the scaling of the identified objects as indicated in the data objects associated therewith, the data object and forming a combined display of the data objects over the retrieved map by locating the indicative visual information of each respective identified physical object, based on information from its respective data object over the map, based on location thereof, also indicated in its respective data object information.

In some embodiments, the additional information relating to the ROI and/or of identified physical objects may be selectively fetched from publicly available scene information such as, for example, satellite images and/or maps of the ROI in which the scene occurs, fetched from respective internet services (e.g., Google® maps, Google® Earth, Bing® Maps, Leaflet®, Mapquest® or Ubermaps) and/or the like.

According to some embodiments, the scene monitoring system may also include a user interface (UI) such as, for example, a graphical user interface (GUI) enabling one or more of the following options:

- Remote identification of physical objects and/or of their attributes;
- remote data sources control (E.g., sensors control)';
- remote control over one or more operational devices and/or subsystems (such as tracking and/or intercepting devices);
- remote SDC control; and/or
- virtual scene data display control.

The GUI may also enable a user to select and/or control data sources. For example, the user may be able to select and operate or disable sensors for data acquisition from afar using a designated GUI sensors selection and control platform. The sensors properties and positioning may also be controlled through this GUI platform allowing the user to adjust sensors location and positioning, sensors FOV, sensors data transmission properties, acquisition and sensing properties such as, for example, acquisition frequency rate, sensor sensibility rate (e.g., camera aperture adjuster properties, audio sensitivity etc.), and/or the like.

The GUI may provide another SDC control platform for controlling the SDC operation and properties. For example, in cases in which the SDC is carried by a movable carrier platform such as a vehicle (for example, a drone and/or an unmanned road vehicle), the GUI may be configured to enable remote driving control of the vehicle.

In some embodiments, the GUI also provides a display control platform for controlling display of the generated virtual scene data. For instance, the presentation control platform provides the user with tools that allows him/her to select the presentation/output device(s) and/or output properties thereof, to select additional information presentation combined with the presentation of the display scene data such as, for example, ROI 2D or 3D topography maps, GPS positioning indicators, speakers or earphones volume, zooming tools, brightness and/or contrasting adjustment tools, and/or the like.

The RS may be located remotely from the ROI and optionally also remotely from the SDC.

According to other embodiments, some or all of the data sources used by the scene monitoring system may be virtual data generators or data generators combining virtual data of scenes with sensors scene data for virtual and/or augmented reality applications such as, for example, virtual reality (VR) or augmented reality (AR) gaming applications, for training purposes and the like.

In these applications, the generated scene source data may allow multiple users (e.g., players) to use sensors such as, for example, video and audio sensors embedded in their mobile devices to generate sensors raw data as the scene source data, and a designated application installed or operable via their mobile devices to modify the scene source data and transmit it to another user.

In embodiments in which the RS uses HMD and/or first person view (FPV) system, to display at least the visual information of the virtual display data e.g., in a 3D deep field visual display and optionally also a stereo auditory display, for providing a user wearing the HMD and/or the FPV system, a full sensory experience in which the user can feel as if he/she is located in the scene ROI.

In some embodiments all of the display devices, sensing devices, and at least some of the communication and/or processing units and/or modules of the RS may be embedded in a single simulator or device such as single HMD.

According to some embodiments of the RS, the RS includes a simulator subsystem comprising one or more of: visual display device(s), auditory display device(s), control device(s). The simulator subsystem may be configured to visually and optionally also auditorily display the generated virtual display data in a controllable and/or responsive manner such as to provide a required display view of the scene, e.g., in RT or near RT. For example, the simulator subsystem may include one or more simulator sensors, sensing the viewer user location in relation to the display device(s) and display the virtual display data also based on the simulator sensors data. The simulator subsystem may include for example, one or more of: HMDs, touch screen(s), screen(s), speaker(s), display control device(s), operational devices remote controlling tool(s) (e.g., for remotely operating tracking and/or weaponry devices located at the scene on in proximity thereto, data processing and/or storage units and the like. The simulator sensors may be configured to sense one or more user physical characteristics and may include, for example, one or more of: accelerometer(s), camera(s), tactile sensor(s), microphone(s) etc., for detecting user parameters such as, for example, the user's positioning (e.g., head positioning), user movement (e.g., head and/or body movements), user gaze focus in relation to the display device(s), points and/or areas thereof, etc.

Reference is made to FIG. 1. A scene monitoring system 1000 may include a scene data collector (SDC) 1100, according to some embodiments. The SDC 1100 is configured to communicate with one or more data sources, such as data source 110A and data source 110B via one or more communication links, for receiving scene source data therefrom and/or for receiving raw data therefrom to be processed for generation of the scene source data at the SDC 1100. Some of the scene source data 1100. For example, the SDC 1100 communicates with the data source 110A via commination link 11 and with the data source 110B via commination link 12.

The data sources 110A and 110B may be any information sources configured to acquire and/or collect and/or generate scene related information, to transmit the related scene information to the SDC 1100 and, optionally, store the scene related information.

Any one or more of the data sources 110A and 110B may include one or more sensors for sensing physical characteristics of scenes and transmitting the acquired sensed information to the SDC 1100.

Any one or more of the data sources 110A and 110B may include storage and, optionally, processing modules such as one or more databases, servers and/or one or more processing modules.

Any one or more of the data sources 110A and 110B may be configured to receive sensors data from one or more sensors that are located at the ROI where a scene occurs, and configured to sense physical characteristic of the scene, and to process the received sensor data to produce or generate scene source data which represents the physical characteristics sensed by the one or more sensors.

Any one or more of the data sources 110A and/or 110B may be configured for generating virtual scene information described by the scene source data or part thereof. This may be used for virtual and/or augmented reality applications of the scene monitoring system 1000. In these cases, one or more of the data sources 110A and/or 110B include one or more memory units, communication modules and a scene generator, designed for generating virtual data portions and a virtual ROI, e.g., by generating virtual visual and audio scenarios in a virtual ROI.

Any one or more of the data sources 110A and/or 110B may be an integral part of the scene monitoring system 1000 or external thereto.

Any one or more of the data sources 110A and/or 110B may be configured to acquire (e.g., sense or detect) physical characteristics of the scene and transmit output data indicative of the scene in RT or near RT to the SDC 1100.

As shown in FIG. 1, the SDC 1100 may also be configured to communicate with one or more remotely located remote station (RSs) such as RSs 210A and 210B via communication links 13 and 14, respectively.

The communication links 11, 12, 13 and 14 may include, for example, one or more of; wireless communication via Wi-Fi communication, Bluetooth communication, radio frequency (RF) wireless based communication, optical-based wireless communication such as infrared (IR) based signaling, and/or wired communication. The communication link 11, 12, 13 and/or 14 may be configured for using one or more communication formats, protocols and/or technologies such as, for example, to internet communication, optical or RF communication, telephony-based communication technologies and/or the like.

The SDC 1100 may be configured to receive scene source data from the data sources 110A and 110B, process the received scene source data, in RT or near RT, in respect to the time the scene source data is transmitted thereto and/or received thereby, for identifying physical objects in the scene and determine their attributes. The SDC 1100 may also be configured to generate, based on attributes of the identified physical objects, data objects, each data object being associated with an identified physical object, and transmit one or more of the data objects to one or more of the RSs 210A and 210B.

According to some embodiments, the processing of the received scene source data may be carried out by the SDC 1100 by assigning each identified physical object with a PLV as one of the attributes determined for the respective identified physical object, and based on other attributes thereof such as based on identity of the physical object, movement physical characteristics thereof etc. The PLV of each object may determine the information that may be included in its respective data object (such as data size and data features) and/or its respective transmission rate.

For example, the process of generating a data object for a specific physical object may include determining the attributes thereof and generating a respective data object, based on the determined attributes of the physical object. The data object may include one or more of:

data portion(s) taken from the received scene source data associated with the physical object (e.g., video frame portion including the visual image of the physical object, positioning of the physical object at the acquisition time taken from positioning sensors, etc.);

modified data portions associated with the respective physical object (e.g., data portions taken from the scene source data that are modified by reducing their overall size by data compression reducing data size and image resolution etc.); and/or one or more of the physical object's attributes.

According to some embodiments, the scene source data is acquired, received and processed by the SDC 1100 in RT or near RT in respect to time the scene source data is acquired (herein "acquisition time") as well as the generation of the data objects and transmission thereof to the RS(s) 210, based on the processing of the received scene source data, for allowing the designated RS 210A and/or 210B to process the received data object(s) in RT or near RT, generate the respective virtual display data, based thereon and display the generated virtual display data in RT or near RT, in respect to the time of receiving the data object(s), for allowing viewers to view a the generated virtual display data representing the scene at each given scene time, within a minimum delay in respect to time the scene has actually occurred.

The SDC 1100 may be operable via hardware modules, communication modules, software modules or a combination thereof.

The SDC 1100 may be located at the ROI (in which the scene occurs) or in proximity thereto or optionally remotely located from the ROI having the ability to perform long distance communication.

In some implementations of the SDC 1100, it may be designed as a relatively small device, designed to be movable by, for example, being attached to or embedded in a carrier platform that may be movable (e.g., driven) and remotely controllable. For example, the carrier platform may be a remotely and/or autonomously driven vehicle such as an unmanned aerial vehicle (UAV) such as a drone, a small road unmanned road vehicle such as a car, a watercraft and/or the like. In these cases, the SDC 1100 can be driven to the area of the ROI by having a user remotely controlling thereof from the RS 210A and/or 210B.

Each of the RSs 210A and 210B may be any device and/or system configured to receive generated data objects from the SDC 1100, generate virtual display data, based thereon, and present the generated virtual display data via one or more presentation module such as, for example, to visual presentation devices such as screen(s), HMD(s) and/or the like, and/or via audio output module such as one or more speakers or earphones, in RT or near RT, in respect to the time of receiving of the data objects.

Each RS 210A and/or 210B may also include communication modules for receiving data from the SDC 1100 and optionally also for transmitting data thereto and/or to the data sources 110A and/or 110B and/or to a carrier platform carrying the data sources 210A and/or 210B and/or the SDC 1100 for remotely controlling one or more thereof.

The SDC 1100 may be implemented, for example, as a programmable logic device (PLD) enabling data processing, storage and communication.

FIG. 2A shows the SDC 1100 structure according to some embodiments thereof. The SDC 1100 may include an SDC communication unit 1110; optionally an SDC sensors control unit 1120; an SDC processing unit 1130; an SDC memory unit 1140; and a SDC logic 1150.

The SDC communication unit 1110 may be configured to communicate with the one or more RSs such as RSs 210A and 210B and with the one or more data sources such as data sources 120A and 120B, via one or more communication links such as links 11-14 by using one or more communication technologies, protocols and/or formats. The SDC communication unit 1110 may be implemented via one or more hardware and/or software based modules.

The SDC communication unit 1110 may also be configured to retrieve and/or receive data from sensors-based data sources that may be attached to or carried by carrier platforms such as humans or vehicles, located at a ROI in which the scene occurs, such as, for example, retrieval of camera, positioning and/or microphone data from smartphones or tablets carried by people located at the ROI, and/or from positioning device(s) embedded in vehicles located at the ROI and/or the like.

According to some embodiments, the SDC communication unit 1110 may be configured to receive scene source data from the one or more data sources 110A, process the received scene source data for physical objects identification and their attributes determination, as well as for generating data objects based thereon, which may be of a significant reduced data size in comparison with the data size of the received scene source data, and 110B for transmission of the generated data objects to the RSs 210A and/or 210B. The SDC communication unit 1110 and/or the data sources 110A and/or 110B may be designed for RT and/or near RT acquiring, receiving and/or transmission of data. The SDC communication unit 1110 may also be designed for transmission of data to the data sources 110A and/or 110B and/or receiving of data from the RSs 210A and/or 210B and/or from other external information sources.

In some embodiments, the SDC communication unit 1110 may include one or more communication devices such as, for example, one or more transceivers and/or modems, enabling communication via one or more communication technologies such as, for example, one or more wireless communication devices such as, for example, Wi-Fi or Bluetooth based transceivers; wired communication devices such as, for example, fiber optic communication devices; satellite based communication transceivers; and/or the like.

The SDC sensors control unit 1120 may be configured for controlling one or more sensors of the data sources 110A and/or 110B, based on analysis of the received sensors data (as part or all of the scene source data) and/or based on control commands arriving in RT or near RT from the one or more RSs 210A/210B.

For example, the SDC sensors control unit 1120 may be configured to remotely control (e.g., by adjusting or configuring) sensors' properties and operation modes, such as by controlling sensors' positioning and movement, sensors operational modes, sensors data acquisition properties, storage and/or transmission features and/or the like.

According to some embodiments, the SDC sensors control unit 1120 may be configured for collection of data outputted from all the sensors in the one or more data sources such as data sources 110A and 110B, and process the received sensors data for generating a scene data that includes all sensors data, serving as the scene source data to be further processed.

The scene source data is then processed by the SDC processing unit 1130 for generating the data objects. This processing may include physical objects identification, attributes determination for each identified physical object, data objects generation and optionally also determination of transmission properties (such as transmission rate) of each data object.

The SDC memory unit 1140 may include one or more data storage modules such as, for example, one or more databases e.g., for storage of any one or more of: rules, operations and/or commands for any of the data processing to be carried by the SDC processing unit 1130; communication related information such as for example, link IDs of known communication links and technologies and their associated communication rules; prioritization rules, commands, thresholds and their associated modification rules; image and/or auditory analysis executable programs and/or the like.

In some embodiments, a database may store non-RT information. In some embodiments, a database may store publicly available scene information comprising satellite images and/or maps, for example, from publicly available scene information (e.g., satellite images and/or maps) fetched from respective internet services (e.g., Google® Maps, Google® Earth, Bing® Maps, Leaflet®, MapQuest® or Ubermaps).

The SDC memory unit 1140 can also be used for storing scene source data, attributes of identified physical objects and/or data objects and optionally acquisition time information, ROI properties and/or the like; sensors related information; and/or RS related information.

In some embodiments, the SDC processing unit may be configured to receive scene source data that may be associated with a specific scene source data acquisition time, from the one or more data sources 120A and 120B, identify one or more physical objects in the scene source data, determine one or more attributes of each identified physical object; and generate, for each identified physical object, data object associated therewith, comprising, for example, one or more of the physical object's attributes, data portions from the scene source data associated with the respective physical object and/or modified data portions from the scene source data associated with the respective identified physical object.

According to some embodiments, to determine one or more attributes of identified physical object and generate the data object thereof, the scene source data may be processed and/or analyzed, using the SDC logic 1150. The analysis of the scene source data may include, for example, image analysis for visual parts of the scene source data and sound analysis for auditory data from the scene source data. The analysis may include assigning PLV of each identified object, as one of the attributes thereof, according to one or more PLV assignment criteria, for determining the importance or interest level of the respective physical object, based on other attributes of the physical object (e.g., by selecting objects of interest based on one or more objects selection criteria), where the generation of the data object may be carried out, inter alia, according to the PLV attribute thereof.

The generation of a data object for a respective identified physical object, may be carried out based on its attributes, by, for example, identifying data portions from the scene source data representing the respective physical object and the overall data size of the one or more data portions identified thereof, determining its attributes such as object identity, physical characteristic(s), positioning etc. and its PLV, and determining data size limitations thereof such a maximum or minimum data size reduction for its associated data object to be generated. The respective data object may then be generated, based on the data size limitation determined. For example, for physical object having low PLV only a few generally descriptive attributes may be included in the data object thereof, such as its object identity or type (tree, sky, vehicle) and positioning thereof such as GPS coordinates, while for physical objects assigned with a high PLV more detailed information may be included in its respective data object such as image portions from video frame(s) or 3D sensor data in which the object is represented and optionally attributes thereof such as location, positioning, identity, type, physical characteristics etc., requiring a much larger data size than that of a data object of a physical object assigned with low PLV. In this manner, information associated with physical object of interest may be much more detailed than information associated with physical objects that are of lower interest, enabling thereby to still reduce the overall size of the acquired scene source data yet transmitting enough information of the scene to the RS(s), optionally in RT or near RT.

According to some embodiments, each data object may also be assigned with a transmission rate determined based on the communication limitations and requirements of each specific RS 210A or 210B to which the object is to be transmitted and/or based on the PLV assigned to its respective physical object.

The one or more attributes determined (e.g., assigned) to each identified physical object may further include a data portion quality level indicative of the quality of the data portion from the scene source data that is associated with the respective physical object such as, as noise level for auditory data portions, positioning data error range, visual resolution for visual data portions and/or the like.

According to some embodiments, all data objects generated for the same scene source data of a respective acquisition time, may be sent to the one or more RSs 210A and/or 210B as a single data package at the same transmission rate, where the transmission rate of each such data package may be determined, based on the respective RS communication requirements and definitions (e.g., taken for the respective RS link ID), and/or based on PLV of one or more of the data objects in the data package, using one or more transmission rules.

The SDC logic 1150 may be configured for controlling, managing, coordinating and/or execution of operations of all other units 1110-1140. In some embodiments, the SDC logic 1150 may be implementable via a central processing unit (CPU).

FIG. 2B shows an optional structure of the SDC logic 1150, according to some embodiments of the SDC 1100. According to these embodiments, the SDC logic 1150 includes a sensors data module 1151; a scene analysis module 1152; a data objects generation module 1153; and optionally also a data compression module 1154; and/or a data encoding module 1155.

Each of these modules of 1151-1155 may be implemented as software modules, hardware modules or a combination thereof.

The sensors data module 1151 may be configured to receive information from one or more of the data sources 110A and/or 110B such as from one or more sensors designed for acquiring scene related information such as acquiring physical characteristics of a scene occurring at a ROI at each given acquisition time; to control the sensors properties such as sensors position, operational modes etc.; and optionally also to process at least some of the information received from the one or more data sources 110A and/or 110B for generating a scene source data in RT, near RT or in non-RT.

The scene analysis module 1152 may be configured to identify physical objects from the scene source data, and determine their one or more attributes, e.g., using one or more data analysis programs and/or processes.

The data objects generation module 1153 may be configured to generate a data object for one or more of the identified physical objects, and optionally also assign a transmission rate to each generated data object or to a data package including all data objects, using one or more generation and assignment programs, processes and/or rules.

In some embodiments, the generated data object may be encoded and/or compressed, via the data compression module 1154 and/or the data encoding module 1155, respectively.

Other embodiments do not require encoding and/or compression of the generated data objects.

Figure 3:
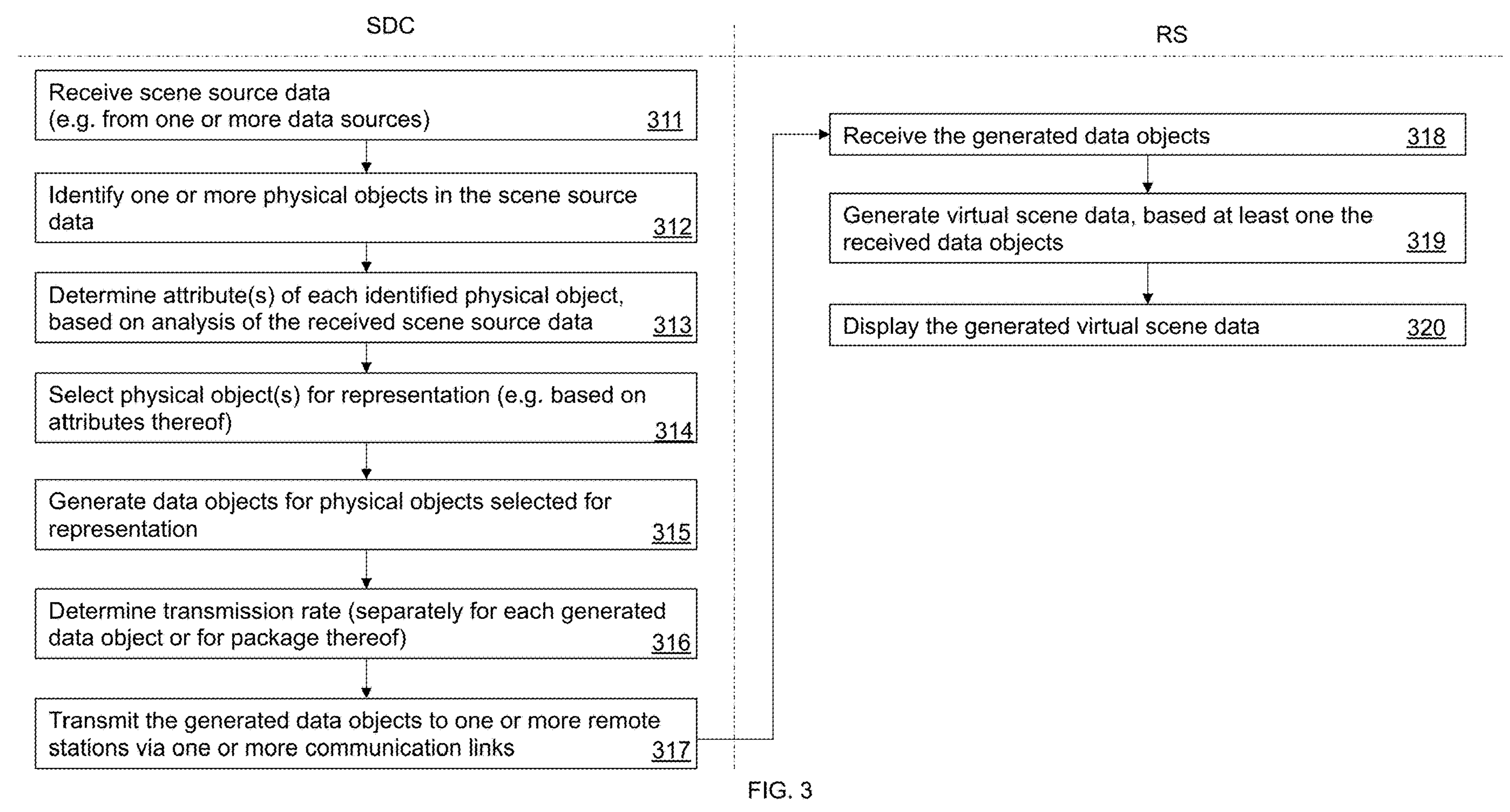
FIG. 3 is a flowchart of a method for providing scene related information, according to some embodiments.

Additional reference is made to FIG. 3, illustrating a process for providing scene related information, according to some embodiments. The process may include:

- Receiving scene source data (block 311), from one or more scene source data, which may include one or more sensors;
- Identifying one or more physical objects in the scene (block 312), e.g., by analyzing the scene source data;
- Determining one or more attributes for each identified physical object (block 313), e.g., based on analysis of the scene source data;
- (optionally) selecting physical object(s) to be represented (e.g., based on PLV attribute thereof) (block 314);
- Generating data object for physical objects (e.g., only for physical objects selected to be represented or all identified physical objects), where each data object is associated with a different physical object (block 315);
- (optionally) determining transmission rate (block 316) for each generated data object or for all generated data objects, e.g., based on PLV of the physical object associated therewith and/or RS requirements and definitions);
- Transmitting the generated data objects to one or more RSs (block 317), e.g., according to the determined transmission rate thereof;
- Receiving the transmitted data objects (block 318);
- Generating virtual scene data, based at least on the received data objects (block 319) and optionally also based on additional information associated with the scene's ROI and/or with physical objects in the scene; and
- Display the generated virtual scene data (block 320).

Steps 311-317 may be carried out using one or more SDCs, and steps 318-320 may be carried out by a RS.

Figure 4:
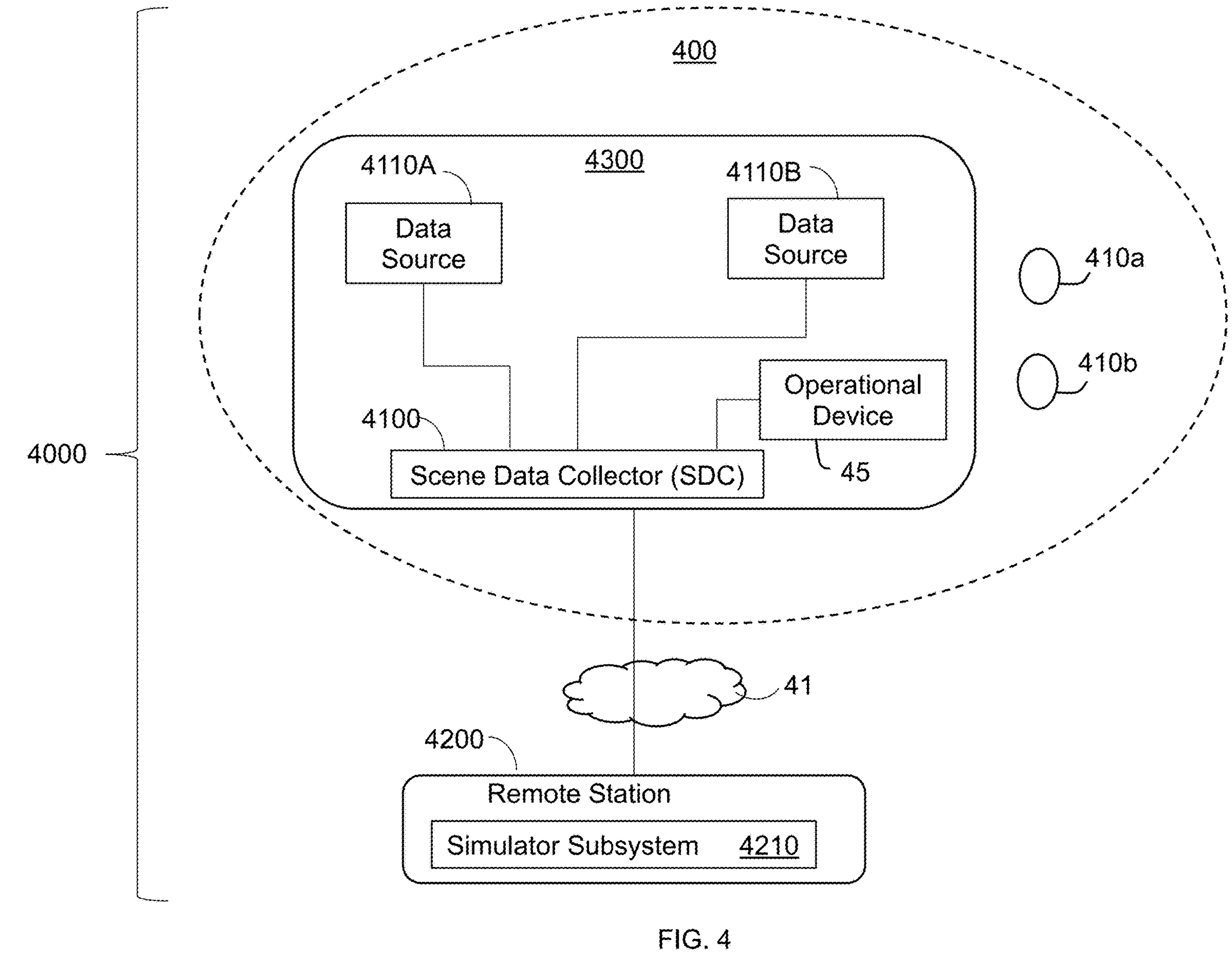
FIG. 4 is a block diagram of a system for providing scene related information, according to some embodiments.

Reference is made to FIG. 4, illustrating a scene monitoring system 4000 including: a SDC 4100; data sources 4110A and 4110B; a RS 4200, remotely located from the SDC 4100; and a remotely controllable carrier platform 400, carrying the SDC 4100 and data sources 4110A and 4110B.

The data sources 4110A and 4110B may be configured to acquire physical characteristics of a scene occurring in a ROI such as ROI 400, e.g., by having one or more sensors such as camera(s) 3D sensor(s), environmental sensor(s), positioning device(s) and the like.

The SDC 4100 may be configured to carry out any of the above mentioned SDC operations such as for receiving scene source data from one or more of the data sources 4110A and 4110B, identify physical objects in the ROI 400 such as physical objects 410*a* and 410*b*, determine attributes of the identified physical objects 410*a* and 410*b*, generate data objects associated with the identified physical objects 410*a* and 410*b*, based on attributes thereof, and transmit the data objects to the RS 4200, optionally in RT or near RT.

According to some embodiments, the carrier platform 4300 may be any type of subsystem, device, apparatus and/or vehicle that is remotely controllable (e.g., remotely driven) from the RS 4200. For example, the carrier platform 4300 may be implemented as a remotely operable drone or road vehicle that can be remotely controlled for positioning thereof (e.g., by flying/driving thereof to the ROI and within the ROI and enabling changing location responsive to changing ROI), or a stationary holding platform movably holding the sensors of the data sources 4110A and 4110B such that the positioning of each sensor (and therefore camera(s) FOV for example) can be controlled and adjusted.

According to some embodiments, the data sources 4110A and 4110B may be embedded as part of the SDC 4100 or configured to communicated with the SDC 4100*b* via one or more communication links.

According to some embodiments, the carrier platform 4300 may be controlled via the SDC 4100, e.g., by having the SDC 4100 configured to receive carrier control commands from the RS 4200 in RT or near RT, and control (e.g., drive) the carrier platform 4300, based on received carrier control commands.

According to some embodiments, the system 4000 may also include one or more remotely controllable operational devices such as operational device 45, which may also be carried by the carrier platform 4300. The operational device 45 may be any device required for the system 4000, for any operational purpose, such as devices used to influence the ROI 400 and/or to influence physical objects at the ROI 400 (e.g., for objects' heating/cooling, marking, damaging, extermination, etc.).

The operational device 45, may be controlled by a user located at the RS 4200, via the SDC 4100, by being operatively connected to or communicative with the SDC 4100. The SDC 4100, in these cases, may be also configured to receive operational device control commands from the RS 4200 and transmit those commands to the operational device 45 for controlling thereof, and/or directly control the operational device 45, based on received operational device commands.

According to some embodiments, the RS 4200 may include a simulator subsystem 4210, configured for RT or near RT, receiving of data objects from the SDC 4100, generating virtual scene data, based thereon, and providing interactive display and control simulation of the scene for enabling a user thereof to have a FPV of the ROI and the scene (e.g., by viewing the virtual display of the scene i.e. the virtual scene data), in RT or near RT, in respect to the acquisition time, and remotely control any one or more of: the SDC 4100, the operational device 45, the carrier platform 4300, and/or the data sources 4110A and/or 4110B, e.g., by using one or more designated control devices of the RS 4200 and/or a designated GUI.

According to some embodiments, due to possible delays caused by gaps between any one or more of:

- the time the scene source data is acquired (herein t0);
- the time required for processing the received scene source data and generating data objects (herein t1);
- the time required for the data object to arrive at the RS 4200 (herein t2);
- the time required for processing the received objects data and generating and displaying virtual scene data thereof (herein t3); and
- the time it takes for control commands sent from the RS 4200 to arrive at and be executed by the SDC 4100 for controlling the SDC 4100, the carrier platform 4300, the data sources 4110A and/or 4110B, and/or the operational device 45 (herein t4),
- the RS 4200 may be configured for carrying out a process of estimation of these time gaps and generating control commands that take into consideration these time gaps in advance, such that these commands will be executed in a timely manner.

For example, for remotely driving a vehicle carrier platform 4300, based on virtual scene data displayed to a user located at the RS 4200, the positioning of the vehicle at the time of command execution (t4) may be estimated via an estimation process, using one or more movement estimation programs or algorithms or by the user (e.g., having the estimated time gap herein T indicated to him/her over the display), such that the control commands sent from the RS 4100 to the SDC 4100 will cause the vehicle to turn from the positioning (location) thereof at the command execution time (t4) and not from previous positioning thereof at to.

The RS 4200 may communicate with the SDC 4100 via one or more communication links, such as communication link 41.

According to some embodiments, the simulator subsystem 4210 may also include one or more RS sensors, configured to sense one or more physical characteristics of a user viewing the virtual scene data and optionally also controlling one or more of: the carrier platform 4300, the SDC 4100, the data sources 4110A-4110B, and/or the operational device 45, and output user data indicative of the sensed user physical characteristics. The simulator subsystem 4210 may also be configured for RT or near RT adaptation of the display of the virtual scene data, also based on RS sensor(s) output.

Figure 5:
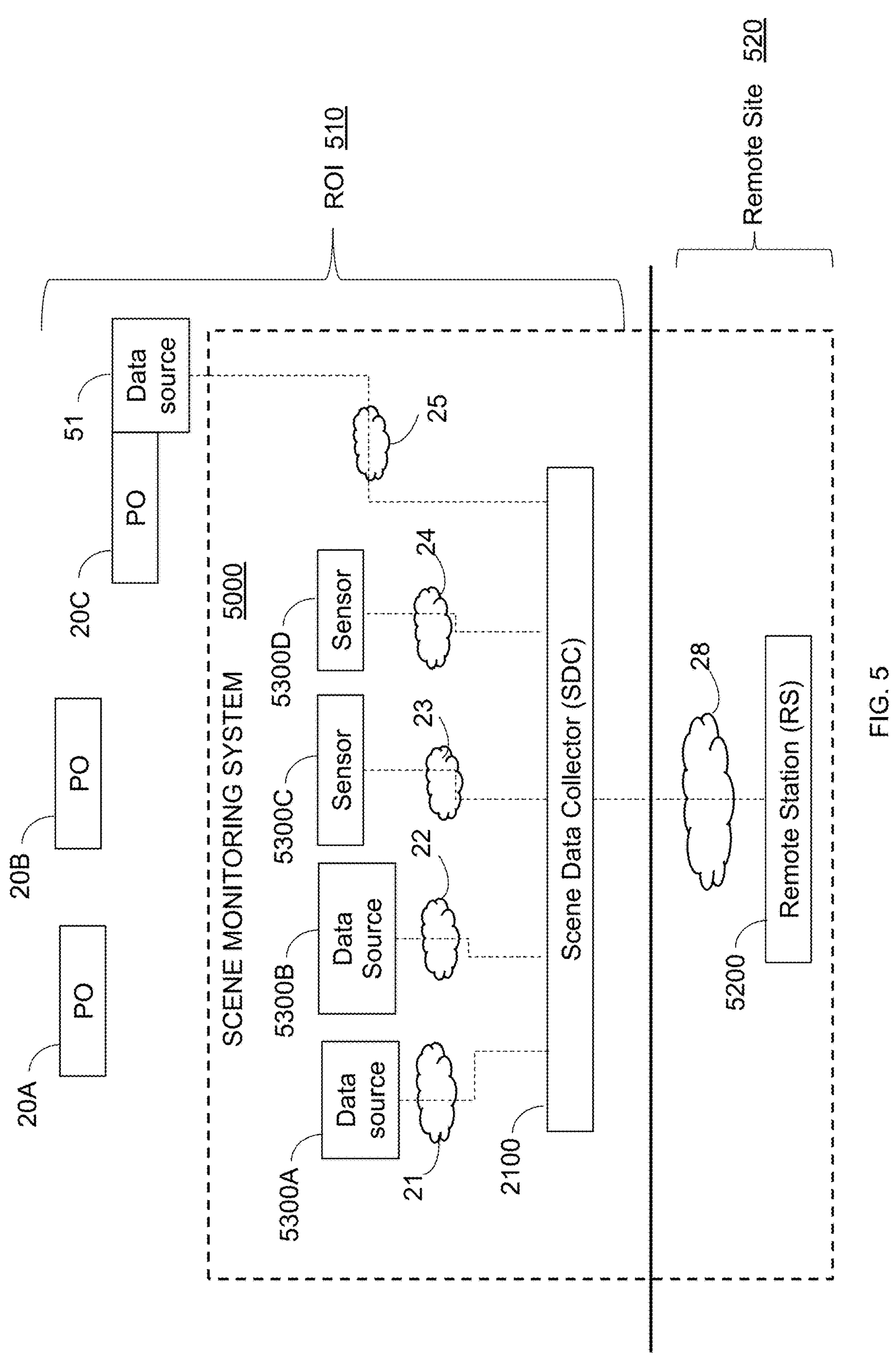
FIG. 5 is a block diagram of a scene information system including multiple data sources, and at least one remote station, according to yet other embodiments.

Additional reference is made to FIG. 5. A scene monitoring system 5000 may comprise a scene data collector (SDC) 5100, multiple data sources such as data sources 5300A, 5300B, 5300C and 5300D, and at least one RS 5200 located at a remote site 520.

One or more of the data sources 5300A-5300D of the scene monitoring system 5000 may be in proximity to and/or at a ROI 510 in which a scene occurs for sensing in RT or near RT physical characteristics of the scene.

For example, the data source 5300A may include one or more visual sensors such as a video camera, one or more thermal cameras (e.g., infrared based cameras) and/or an array of video cameras e.g., arranged symmetrically for acquiring 360 degrees video images from the scene or multiple video cameras scattered in the ROI 510. The one or more video cameras may be configurable such that parameters thereof such as zooming, illumination, orientation, positioning, location and/or the like, can be adapted (e.g., adjusted, configured, and/or directed from afar), automatically, manually and/or semi-automatically. The data source 5300A may be configured to output and transmit 2D visual data to the SDC 5100 via communication link 21.

The data source 5300B may include one or more audio sensors such as one or more directional and/or non-directional microphones for acquiring audio information from the scene. Directional microphones can be directed or configured to enhance audio signals associated with identified objects such as speakers. The data source 5300B may be configured to output and transmit auditory to the SDC 5100 via communication link 22.

The data source 5300C may include one or more 3D sensors for sensing in RT or near RT 3D physical objects (POs) in the scene such as POs 20A, 20B and 20C (e.g., humans, vehicles, still objects such as buildings, devices or machines located at the ROI 510 and/or the like). For example, one or more of the 3D sensors may include a laser-based 3D sensor configured to scan the ROI 510 or parts thereof for producing 3D points clouds. The data source 5300C may be configured to output and transmit 3D visual data to the SDC 5100 via communication link 23.

The data source 5300D may include one or more environmental sensors or devices for sensing environmental characteristics of the scene such as one or more weather measuring devices e.g., thermometer, wind parameters device(s), illumination sensor(s) and/or the like). The data source 5300D may be configured to output and transmit environmental data to the SDC 5100 via communication link 24.

One or more of the POs in the scene such as PO 20C may be associated with an external data source such as external data source 51 that is external to the scene monitoring system 5000 and configured for acquiring information from the scene that is associated with one or more characteristics of the scene. For example, a human PO 20C may be carrying a mobile communication device (as data source 51), as the external data source, such as a smartphone, capable of acquiring video and stills 2D visual data via a camera embedded therein and auditory via a microphone embedded therein and optionally also positioning information (e.g., GPS data) and/or environmental data.

The SDC 5100 of the scene monitoring system 5000 may be configured to extract information relating to the scene from the mobile device external data source 51, carried by the human PO 20C located at the ROI 510, via communication link 25.

All scene source data acquired from all data sources 5300A-5300D and optionally also from external data source 51, may be sent to or extracted by the SDC 5100 via the communication links 21-25, in RT or near RT and optionally also stored by the SDC 5100 in one or more memory units thereof.

The scene source data may be received from one or more of the data sources 5300A, 5300B, 5300C, 5300D and/or 51 or generated by processing the combined data received from the various data sources. The scene source data may be processed by the SDC 5100 for generating the data objects based on identification of POs in the ROI 510 and their associated attributes, as described above.

The process of receiving scene source data and generating data objects based on processing of the received scene source data, may be carried out by the SDC 5100 as an ongoing process in RT or near RT. For example, the SDC 5100 may receive the scene source data ultimately originating from the one or more data sources 5300A-5300D and optionally also from data source 51 in a continuous manner, process the received scene source data (e.g., by identification of POs and attributes thereof) for generation of data objects for at least some of the identified POs, and transmit the generated data objects in RT or near RT to the RP 5200.

The RS 5200 may be configured to receive the data objects from the SDC 5100, generate virtual scene data based thereon and display the generated virtual scene data via one or more display devices thereof. For example, the RS 5200 may include one or more, communication modules, one or more display devices, one or more processing modules and one or more data storage modules for communication, display, processing and/or storage of data.

The RS 5200 may also be configured to retrieve additional scene information relating for example to the ROI 510 such as maps of the area indicative of various topographical related ROI 510 information and/or the like and generate the virtual scene data based on the received data objects as well as based on retrieved additional information. The RS 5200 may further be configured to process the received data objects e.g., during display of the virtual scene data based thereon, for instance, for identification and/or indication of alerting situations of which the user at the RS 5200 should be notified and/or for remote controlling of the SDC 5100 or any other additional device controlled via the SDC 5100, based on virtual scene data and/or data objects analysis done by the RS 5200.

In some embodiments, the RS 5200 may transmit a link ID, to the SDC 2100 before the monitoring of the scene is initiated, for allowing the SDC 5100 to process the scene source data and/or generate the data objects based thereon, according to communication definition, requirements and/or limitations of the specific RS 5200 based on its respective link ID. The communication definitions, requirements and/or limitations of a specific RS may change over time. Correspondingly, the SDC 5100 may be configured to update the link ID of the RS 2200 and/or information stored therein indicative of the specific communication information of the respective RS, over time. For example, the RS 5200 may send updated communication information to the SDC 5100, whenever communication definitions, requirements and/or limitations thereof are changed (e.g., due to security reasons, communication disruptions etc.).

Further referring to FIG. 6A, the RS 5200 may comprise a RS communication unit 5210; a RS processing unit 5220; a RS memory unit 5230; a RS scene display logic 5240 and display devices 5251A, 5251B and 5251C.

The RS communication unit 5210 may be configured to communicated with the SDC 5100, e.g., for receiving data therefrom such as data objects and optionally data indicative of parameters values of any one or more of: carrier platform carrying the SDC 5100, operational device(s) operated via the SDC 5100, data sources 5300A-5300D, etc., via one or more communication links such as communication link 28 and optionally also to transmit data to the SDC 5100.

The RS processing unit 5220 may be configured to process the received data objects e.g., for generating virtual scene data, based thereon; for identification and indication of alerting situations relating to the scene; and/or for remotely controlling the SDC 2100 and optionally for controlling one or more other platforms, devices, subsystems and/or the data sources 5300A-5300D.

The RS memory unit 5230 may be configured for storing data objects and optionally also other related information and/or programs and/or rules.

The display devices 5251A-5251C may include for example, one or more visual display devices such as a screen display device 5251A and one or more audio output devices such as a speaker or earphones display device 5251B, a 3D (e.g., hologram) display device 5251C and/or the like. All or some of the display devices 5251A-5251C may be embedded in a single simulator subsystem, an HMD or any other combined user display apparatus.

One or more of the display devices 5251A-5251C (e.g., if combined into a single HMD) may include one or more RS sensors for configuring the display of the virtual scene data according to sensed information relating to the user. For example, in case of an HMD, sensors sensing the user's head motions and/or gaze focus can be used for adapting the display to the motion and/or positioning of the user for creating a deep field view, FPV, and/or a 3D real sense of the virtual scene data.

In some embodiments, the HMD display device, the SDC 5100, and/or any other devices, sensors and/or platforms of the system 5000 may be configured such that the RS sensors data may be used for controlling of one or more of the devices, subsystems and/or platforms located remotely from the RS 5200. For example, is using an HMD having RS sensors embedded therein, sensed movements of the user wearing thereof may be translated into executable commands that enable, correspondingly, (e.g., slaved) controlling of one or more of: the SDC 5100, carrier platform carrying the SDC 5100, operational device(s) operable via the SDC 5100, the sensors of one or more of the data sources 5300A-5300D, and the like. Configuration commands may include for example one or more of: configuration of the data source(s) 5300A-5300B sensors' orientation: positioning, settings, acquisition parameters (e.g., zooming parameters, gimbaling parameters, data storage related parameters, data transmission related parameters and the like); configuration of sensors' location; and the like.

In some embodiments, the SDC 5100 and the RS 5200 may be configured to enable automatic remote tracking of POs in the scene by automatically controlling sensors of the data sources 5300A-5300D controlled and configured in an ongoing configuration process for tracking identified POs having high PLV attributes assigned thereto.

FIG. 6B shows the RS scene display logic 5240 configuration, according to some embodiments thereof. In some embodiments, the RS display logic 5240 may be configured to receive the data objects from the one or more SDCs such as SDC 5100, process the received data objects, compose virtual scene data, based thereon e.g., using one or more display reading and/or composing programs, and controllably display the composed (generated) virtual scene data. The RS scene display logic 5240, may include: a data decoding module 5241; a composer module 5242; and a display control module 5243. In some embodiments, the RS scene display logic 5240 may be implementable via one or more central processing units (CPUs).

In some embodiments, the data decoding module 5241 may be configured to decode encoded data objects and/or encoded data packages including data objects.

In some embodiments, the composer module 5242 may be generally configured to receive the data objects, generated virtual scene data, based thereon, and controllably display the virtual scene data, via the one or more display devices.

The composer module 5242 may also be configured for retrieving additional information relating to the scene ROI and/or to the physical objects indicated in the received data objects, e.g., for replacing data object's content with a more detailed replacement data of the respective physical object such as replacement 2D/3D images from one or more replacement data reservoirs of the respective physical object (e.g., identified using identity data attribute thereof indicated in its respective data object). The replacement may be made also by calculating replacement properties for the respective replacement data such as the exact location, orientation, size and the like of the replacement data in respect to the overall display of the virtual scene data.

For example, a data object received at the RS 5200, including only one or more attributes thereof such as its GPS position/location and its identity (a specific person's name, the PLV assigned thereto and its RT or near RT GPS coordinates at the acquisition time), the composer module 5242 may use this information to construct or retrieve a more detailed 2D or 3D image representing that person (e.g., if its PLV is above a minimum PLV threshold) and locate this image in the overall 2D, 3D or panoramic display of the virtual scene data, based on the GPS information, in relation to other objects' location/positioning. If the PLV of the respective physical object is lower than the minimum threshold, o less detailed image, indicator or marker may be retrieved, constructed and displayed in the respective location/positioning.

Optionally, the composer module 5242 may also be configured to retrieve additional data associated with the ROI 510 from one or more databases (e.g., geographical information such as, for example, topography and/or mapping of the ROI 510 and/or the like) and to combine POs constructed representation and ROI 510 retrieved information, e.g., by placing visual images/models/indicators of POs representation associated with the received data objects over a map of the ROI at locations over the map that correspond to the RT or near RT positioning or locations of these POs in the ROI 510 in a dynamic manner, e.g., by updating positionings/locations of POs, adding and removing display of POs and/or changing ROI 510 dynamically, based on RT or near RT updates (new data objects changed location thereof and/or any other new objects and/or ROI information).

In some embodiments, the display control module 5243 may also include a user interface (UI) such as a graphical user interface (GUI) providing users of the RS 5200 with graphical tools for controlling the display properties of the virtual scene data and optionally also for retrieving and displaying of the additional data. The UI may also enable the users to control the SDC 5100 and/or any other remotely located device, sensor or platform via the SDC 5100.

In some embodiments, the display control module 5243 may also be configured to control (e.g., via user input done using the UI and/or via user sensor output if using an HMD) any one or more of the display devices 5251A-5251C. For example, controlling visual and/or auditory parameters of the display scene data such as audio output volume, brightness and/or zooming properties of the visual display, to fit user's requirements or positioning (e.g., in case of HMD sensing head movements of the user for adjusting visual and/or auditory display through the HMD output devices).

Figure 7:
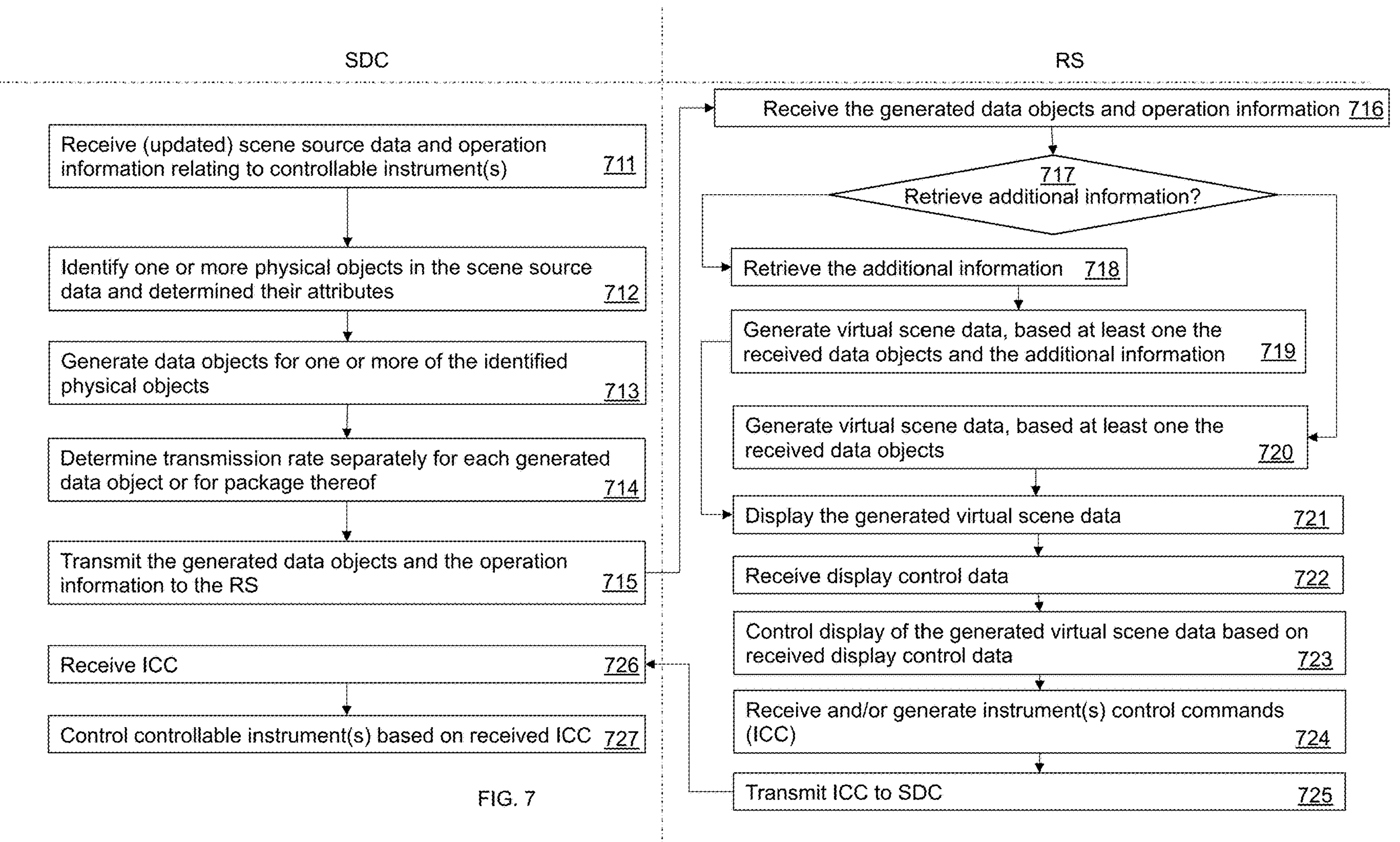
FIG. 7 is a flowchart illustrating a process for providing scene related information to a remotely located user via a remote station, and remotely controlling one or more controllable instruments from the remote station, according to some embodiments.

Additional reference is made to FIG. 7 Illustrating a process for providing scene related information to a remotely located RS, including remote controlling of one or more controllable instruments such as, for example, the SDC, one or more sensors used as data sources, one or more operational devices, a carrier platform carrying one or more of the other instruments etc., according to some embodiments. This process may include:

- Receiving scene source data from one or more data sources such as one or more sensors located and configured to sense scene/ROI physical characteristics (block 711) and receiving, determining and/or identifying operation information, indicative, for example, of operation state and/or location of one or more controllable instruments, such as the SDC, the on-site sensors, one or more operational devices and/or a carrier platform carrying one or more of the other controllable instruments;
- Identifying one or more physical objects, e.g., by analyzing the received scene source data and determining attribute(s) for each identified physical object (block 712);
- Generating one or more data objects, each associated with a single different identified physical object, based on analysis results and/or attribute(s) of each identified physical object (block 713), where each generated data object may include any one or more of: one or more of the attributes of the respective physical object, one or more data portions taken from the scene source data associated with the respective physical object, one or more modified data portions;
- Determining transmission rate for each data object generated or for the entire group of data objects generated (block 714), e.g., based on link ID of the respective RS and/or based on PLV attribute(s) of one or more of the identified physical objects associated with the generated data objects;
- Transmitting the generated data objects (e.g., according to their transmission rate) and the operation information to the RS (block 715), via one or more communication links;
- Receiving (at the RS) the transmitted data objects and operation information (block 716);
- Checking whether additional information relating to the physical objects and/or the ROI is required (block 717), e.g., by processing the data objects and based on processing results;
- If required—retrieving additional information from one or more sources (block 718), and generating virtual scene data, based on the received data objects as well as the retrieved additional information (block 719);
- If no additional information retrieval is required, generating virtual scene data, based on the data objects (block 720);
- Displaying the generated virtual scene data (block 721) e.g., using one or more display devices of the RS;
- Receiving (e.g., updated) display control data 722 and controlling the display based on received display control data 23;
- Receiving (e.g., via user input) and/or generating (e.g., via analysis of the received operation information) instrument(s) control command (ICC) (block 724);
- Transmitting the ICC to the SDC (block 725);
- Receiving (at the SDC) the transmitted ICC (block 726); and
- operating one or more of the one or more controllable instruments, according to the received ICC (block 727).

According to some embodiments, the process illustrated in FIG. 7 may be carried out in RT or near RT, where the scene source data and following virtual scene data display as well as the controllable instrument(s) control are carried out in a continuous RT or near RT manner in respect to the time the scene source data is received and/or acquired.

According to some embodiments, at least some of the steps of the process illustrated in FIG. 7 may be carried out in a discrete manner, where an update of the scene source data and therefore the virtual scene data derived therefrom, is carried out at each given time-span and/or only when required. In these cases, the control of the one or more controllable instruments may still be carried out in RT or near RT.

Figure 8:
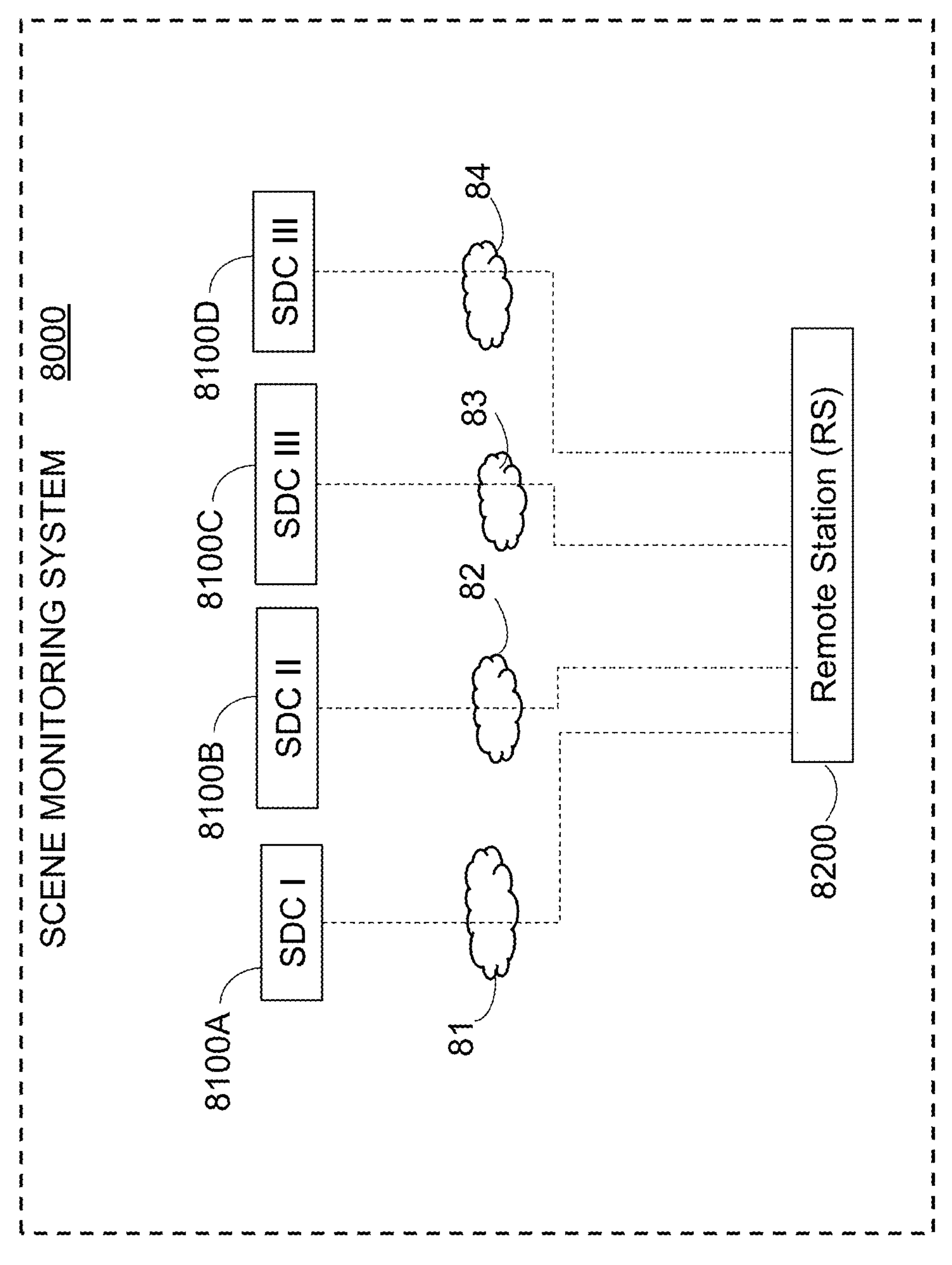
FIG. 8 is a block diagram illustrating a scene monitoring system having multiple scene data collectors remotely located and/or controllable via at least one remote station, according to some embodiments.

Additional reference is made to FIG. 8. A scene monitoring system 8000 for providing scene related information may include multiple SDCs 8100A, 8100B, 8100C and 8100D configured to communicate with one or more RSs such as RS 8200, which may be also a part of the scene monitoring system 8000.

Having multiple SDCs such as SDCs 8100A-8100D may allow remote controlling (e.g., via the RSs 8200) of multiple ROIs and/or multiple events or scenes, for example, according to communication resources limitations and/or requirements.

According to some embodiments, each SDC 8100A/8100B/8100C/8100D may communicate with the RS 8200 via one or more communication links. For example, SDC 8100A may communicate with the RS 8200 via communication link 81; SDC 8100B may communicate with the RS 8200 via communication link 82; SDC 8100C may communicate with the RS 8200 via communication link 83; and SDC 8100D may communicate with the RS 8200 via communication link 84.

In some embodiments, the scene monitoring system 8000 may be configured to enable remote controlling and/or viewing of one or more ROIs and one or more scene occurring therein by communicating and optionally also controlling operation of several SDCs such as SDCs 8100A-8100D. For example, each SDC from 8100A-8100D may include the one or more sensors data sources (e.g., by being embedded therein) enabling sensing one or more physical characteristics of the scene and the ROI in which the specific SDC is located. Each SDC 8100A/8100B/8100C/8100D may be configured to sense the ROI and scene in which it is located, and process the received sensors data (as the scene source data) to data objects, based on processing of the sensor data and transmit the generated data objects associated with the respective SDC and ROI to the RS 8200 e.g., in RT or near RT. The RS 8200 may be configured to receive data objects from all the SDCs 8100A-8100D and process the received data objects (e.g., separately for each SDC) to generate and display virtual scene data for each SDC. The RS 8200 may further be configured to remotely control the operation of each of the SDCs 8100A-8100D e.g., for remotely controlling one or more controllable instruments via the respective SDC, such as operational device(s|), carrier platform carrying the respective SDC, the sensors thereof and/or the operational device(s) thereof.

In some embodiments, the RS 8200 may control the ROI it is designated to by ignoring display scene data arriving from SDCs located in areas that are not of interest at the current time and/or simply nulling operation of some of those SDCs, thereby enabling at each given moment or time-period to display information only of scene that are of interest and adaptively change the ROI(s) in an event-responsive manner. In some embodiments, the system may be configured to associate different attributes and/or PLVs to the same object. For example, a first attribute and/or PLV may be associated with a first object for the transmission of corresponding data objects to a first remote station; and a second attribute and/or a second PLV, different from the first attribute and/or PLV, may be associated with the first object for the transmission of corresponding data objects to a second remote station.

Figure 9:
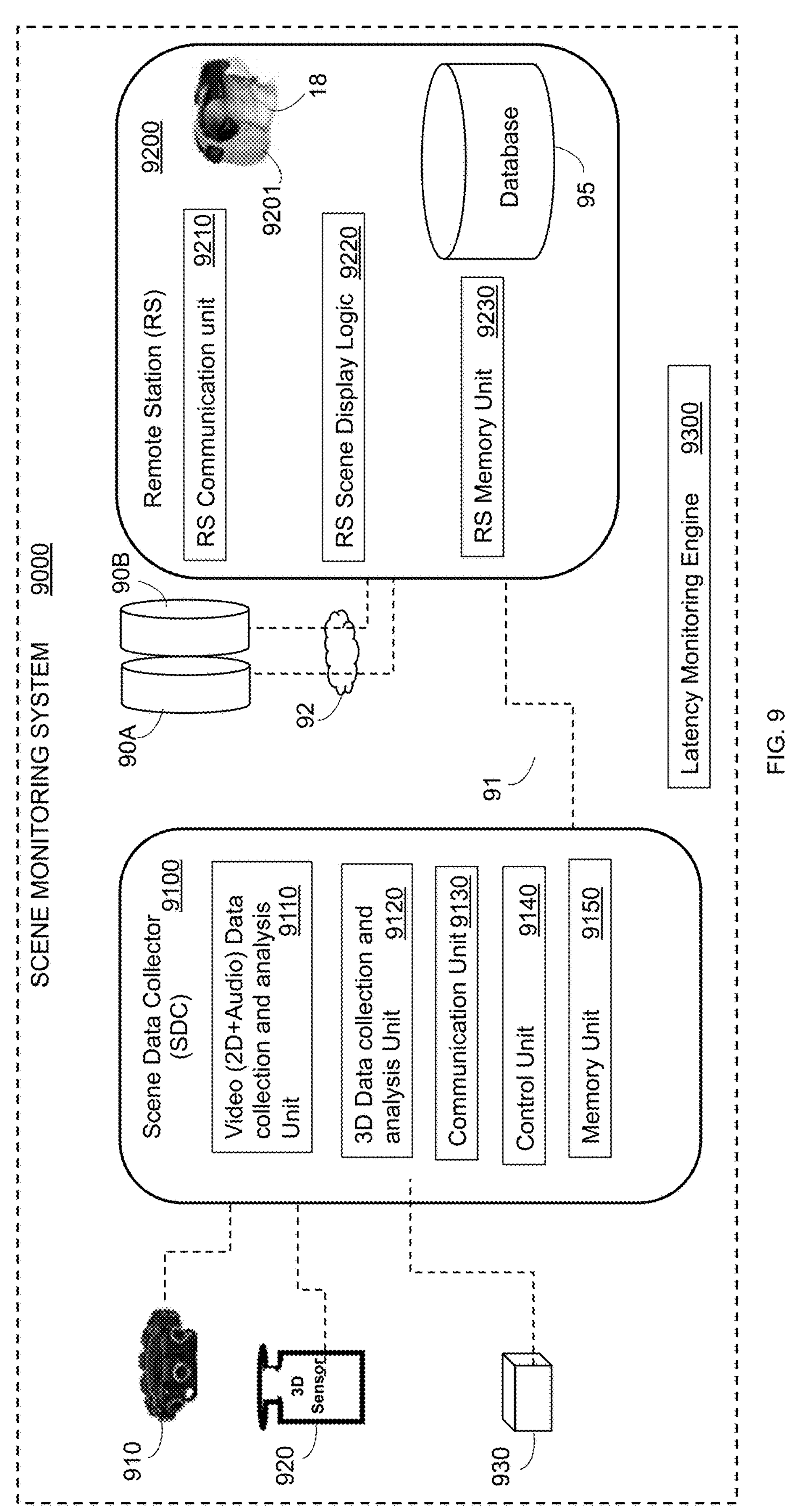
FIG. 9 is a block diagram illustrating a scene monitoring system that includes a scene data collector communicating with multiple sensors and a remote station having a head mounted display (HMD) device, at least for three-dimensional visual display of scene related information, according to some embodiments.

Additional reference is made to FIG. 9. A scene monitoring system 9000 for providing scene related information, according to some embodiments, may include one or more SDCs such as SDC 9100 operable and/or controllable via one or more RPs such as via RS 9200, which may be also a part of the scene monitoring system 9000.

The SDC 9100 may be configured to receive scene source data from one or more sensors such as, for example, one or more visual sensors such as an array of video cameras 910 optionally having video and audio sensing devices, a 3D sensor 920, and/or a positioning device 930, at least one of which may be part of the scene monitoring system 9000 or external thereto.

In some embodiments, the SDC 9100 may include a video (and audio) data collection and analysis unit 9110; a 3D data collection and analysis unit 9120; an SDC communication unit 9130; a control unit 9140; and a memory unit 9150.

In some embodiments, the video data collection and analysis unit 9110 may be configured to receive from the camera array 910, and process/analyze visual video and auditory data (e.g., if the camera array 910 includes one or more microphones) outputted from the camera array 910, for instance, for identifying 2D data portions in video frames thereof and auditory data portions for physical objects and their attributes identifications.

In some embodiments, the video data collection and analysis unit 9110 may enable, e.g., via one or more programs and/or algorithms operable thereby, to identify physical objects' data portions and their associated attributes such as visual target objects, their location in each frame of the visual 2D video data, their identity, their object type (e.g., human, vehicle, landscape, sky, tree) and the like, and optionally also assign PLV attributes thereto. The video data collection and analysis unit 9110 may use one or more image and/or audio analysis algorithms/programs to carry out the identification of the data portions of physical objects and determine their attributes, for example by frames data comparison and distinction of changes therein, speech detection and the like.

The video data collection and analysis unit 9110 may also be configured to generate data objects of the identified physical objects, based on their attributes, e.g., by determining the classification(s) of the data object, determining its content (e.g., a data object containing only one or more of it attributes, the data portions from the video data and/or auditory data from the sensors data and/or a modification thereof).

In some embodiments, the visual data collection and analysis unit 9110 may be configured to use one or more data packaging, and/or transmission techniques, for efficient transmission of the data objects generated, forming a n updated respective data objects' package for each received scene source data, to be transmitted to the RS 9200 in RT or near RT, in respect to the time of receiving and/or processing of the scene source data.

According to some embodiments, to modify data portions of the scene source data, MPEG® video data compression may be used for reducing overall size of these data portions.

In some embodiments, the 3D data collection and analysis unit 9120 may be configured to receive data from the 3D sensor(s) 920 and/or from the positioning sensor 930 for identification of 3D data portions (e.g., points clouds) of physical objects at the ROI, and identify positioning thereof, using the positioning sensor 930. The positioning data from the positioning sensor 930 may also be used by the video data collection and analysis unit 9110 for 3D positioning of physical objects. According to some embodiments, the data object generated for each or some of the identified physical objects, may include, for example, one or more of:

The data portion(s) associated therewith taken from one or more of the sensors, such as the physical object's: video frame(s) portion(s) (from the video cameras array 910), the 3D cloud portion (from the 3D sensor 920), the positioning thereof (taken from the positioning sensor 930), audio data portions such as detected speech portions, etc.;

Modified data portions associated with the respective physical object, generated, for example, by reducing data size of one or more of the data portions of the respective object, using one or more compression programs, extracting only contour lines of an image of the object etc.; and/or Attributes of the respective physical object, such as its PLV, identity attribute, data type attribute, and the like.

According to some embodiments, the RS 9200 mat receive the data objects of a respective scene source data (e.g., of a respective acquisition time) and process this data to generate and display virtual scene data, based thereon.

In some embodiments, the RS 9200 may include a combined 3D and 2D Visual data display (e.g., via an HMD worn by a user), for example, by having the RS 9200 using one or more techniques for enabling a combined 2D and 3D objects display. In some embodiments, a texture atlas data size reduction may be used for arranging the data portions, for optimizing compression of 2D and/or 3D visual data. For example, the video data portions in the data object of a respective ROI background or landscape physical object, may be used for creating a panoramic view of the background of the scene ROI and/or also for allowing changing the background/landscape according to user position for enabling the user a real scene location sensation (e.g., FPV), while 3D and/or other 2D objects related data portions may be displayed in full HD in the ROI display.

In some embodiments, each of the data objects, associated with the same scene source data and acquisition time, may be assigned by the SDC 9100 with a different, transmission rate, e.g., based on its PLV attribute and transmit the respective data object according to its assigned transmission rate. This process may require the RS 9200 to be configured for identifying the acquisition time for each arriving data object, to identify the update timing thereof. For example, background and/or less important physical objects may be updated at the RS 9200 less frequently than more important physical objects (i.e., objects of interest). Therefore, the SDC 9100 may be configured to assign lower transmission rates to the less important physical objects (e.g., having PLVs lower than a predefined threshold and/or if defined by identity attributes as attributes automatically considered as of low importance such as background identity attribute). Accordingly, the RS 9200 may only update display of corresponding virtual display data parts in a corresponding less frequent manner.

According to some embodiments, the PLV of these low-priority physical objects may change over time and therefore the transmission rate of their respective data object may also be changed, responsively.

The communication unit 9130 may be configured for controlling communication with the one or more sensors such as sensors 910-930 via one or more communication links such as SDC-RP communication link 91.

The memory unit 9150 may include one or more data storages for storing and retrieval of sensors data, computer readable programs for data processing, one or more databases for data portions modification and analysis purposes, and/or communication related data.

In some embodiments, the RS 9200 may include a RS communication unit 9210; a RS scene display logic 9220 and a RS memory unit 9230. The RS communication unit 9210 may be configured for controlling communication with SDC 9100 and optionally also with one or more of the sensors 910-930. The RS scene logic 9220 may be configured for data processing and data modification; and the RS memory unit 9230 may be configured for data storage and data retrieval.

In some embodiments, the RS scene display logic 9220 may be configured for receiving the data objects from the SDC 9100 and generate and controllably display virtual scene data, based on processing of the received data objects. For example, the RS scene display logic 9220 may identify and distinguish between: (i) data objects including modified or unmodified data portions and/or attributes of physical objects and generate a visual and optionally also auditory virtual scene data, based thereon.

The visual parts of the virtual scene data generation (e.g., update) may be carried out by retrieving visual additional information when required for one or more physical objects requiring thereof (e.g., for background physical objects associated with data objects including only one or more identifying attributes thereof—requiring retrieval of background visual additional information such as retrieval of the ROI map of parts thereof) and integrating visual presentation of data objects including full or reduced resolution (modified or unmodified data portions) with retrieved visual data.

For example, the auditory data should be synchronized with the ongoing visual display for allowing the user at the RS 9200 to perceive a coherent sense of the scene over a timeline that corresponds with the scene timeline. Optionally, the 2D visual data can be combined with the 3D visual data to form a 3D scene related scenario, e.g., by using HMD 9201 or any other deep field view or 3D simulator subsystem instrumentation and/or technique(s), for example by taking all the 2D objects and rendering them for providing a 3D display thereof. The combined 3D display of all visual data taken from the virtual scene data and the display of auditory data combined and synchronized therewith may be enabled via the HMD 9201 for providing a user 18 with a FPV and sensation of the scene.

In cases in which additional information retrieval and display is required, additional data reservoirs may be used such as database 95 including, for example, 2D and/or 3D visual images, maps, and/or models of ROIs physical objects. Optionally at least some of the additional information may be retrieved from one or more publicly or exclusively available replacement data sources such as additional data sources 90A and/or 90B (e.g., 2D images and/or 3D models libraries and the like), which may be accessed via one or more communication links such as via an internet link 92.

In some embodiments, one or more of the head movements of the user 18 wearing the HMD 9201 may be translated into operational commands for controlling RS 9200 display and/or for controlling any one or more of: the sensors' 910-930 and/or SDC 9100 operations and/or operations of additional devices and subsystems via the SDC 9100 such as a carrier platform carrying the SDC 9100 and/or the sensors 910-930 and/or one or more operational devices. For example, head movements of the user 18 wearing the HMD 9201 may control positioning, orientation, focusing and/or gimbal parameters of the cameras array 910 for allowing the user 18 to remotely control his/her line of sight (LOS) and/or field of view (FOV), change ROI, focus (e.g., zooming) on objects of interest etc.

In some embodiments, one or more of the sensors of the system 9000 (such as the camera array 910) may also be configured to sense a relative motion or updated distance between the sensor 910 and the ROI or a line of sight (LOS)

of the user 18 using the HMD 9201 for instance, for better directing and/or focusing the sensor's positioning and orientation according to the user's needs.

As will be discussed in more detail herein below, in some embodiments, scene monitoring system 1000 may be configured to selectively display scene images at a remote station 5200 in two modes:

a local station data display mode (also: low-latency mode), and a scene data display mode (also: high-latency mode).

In both the local station data display mode and the scene data display mode, scene information may be displayed using previously acquired information, which may for example be retrieved from (e.g., publicly available) maps and/or atlases and/or a synthetic view of the scene. In the local station data display mode, the synthetic view of the scene may be processed and generated based on previously acquired scene data and/or based on data objects received from the scene, as outlined herein in more detail.

In some embodiments, in the local station data display mode, all information displayed to the user about the virtual model carrier platform's surrounding environment is based mostly or entirely on locally processed data, descriptive, for example, of previously acquired information and/or data objects.

In some embodiments, in the local station data display mode, a virtual model carrier platform is constructed locally or rendered locally at the station for display to the user, in accordance with inputs received from the user at the station, optionally, irrespective of actions responsively or concurrently performed by the real-world carrier platform which is located in the scene, in response to the user-provided control inputs.

In some embodiments, in the local station data display mode, station scene data that is readily available at the remote station is used for displaying information to the user, e.g., to generate a partially or fully synthetic view of an environment surrounding the virtual model carrier platform. This may even be the case when the local station scene data may not accurately reflect the actual situation in the scene.

Employing the local station data display mode, may have the effect that the user does not perceive any latency or delay between the providing of a command input and the displayed command execution by the locally rendered virtual model carrier platform.

Such latency or delay may, on other hand, be experienced by the user when viewing is in the scene data display mode, e.g., because of the time required to perform data processing both locally and remotely, the transmission of commands to the remote real-world carrier platform, the processing of the commands by the remotely controlled carrier platform, the execution of the commands actions by the remotely controlled carrier platform, the transmission of the respective information from the scene back to the station, and the rendering of the information at the station.

In the local station data display mode, the system may disregard constraints concerning real-time parameter values concerning data processing and/or transmission for executing commands and/or actions by the remotely controlled carrier platform, which is located in the scene.

For example, by displaying scene information using the local station scene data, delays and/or the processing time required to perform, for example, the following: transmitting commands from the station to the carrier platform located in the scene, processing time to execute the command, and/or the transmission time to receive sensor data transmitted from the scene to the remote platform are non-existing, e.g., the displayed information is generated based on the processing of readily available locally stored data.

In the scene data display mode, the system does take into consideration, when displaying information to the user at the station, at least to some extent, delays and/or the processing time required to perform, for example, the following: transmitting commands from the station to the carrier platform located in the scene, processing time to execute the command, and/or the transmission time to receive sensor data transmitted from the scene to the remote platform. For example, scene data is transmitted from the scene to the remote station, processed, and displayed at the remote station. The time from the transmission to the reception of scene data includes a transmission time, causing transmission-incurred latency of the displayed information.

In some embodiments, either the local station data display mode, or the scene display mode may be displayed. In some embodiments, the local station data display mode and the scene data display mode may be displayed simultaneously, e.g., in juxtaposition on a same display device, or, respectively, by different display devices. In some embodiments, the local station data display mode may be displayed in overlay to the scene data display mode. In some embodiments, the scene data display mode may be displayed in overlay to the local station data display mode. In some embodiments, information of the scene data display mode may be fused with information of the local station data display mode.

In some embodiments, the user may choose that the system displays only one of the scene data display mode and the local station data display mode, or both at the same time, in juxtaposition, fused or overlayed display.

Figures 10A, 10B:
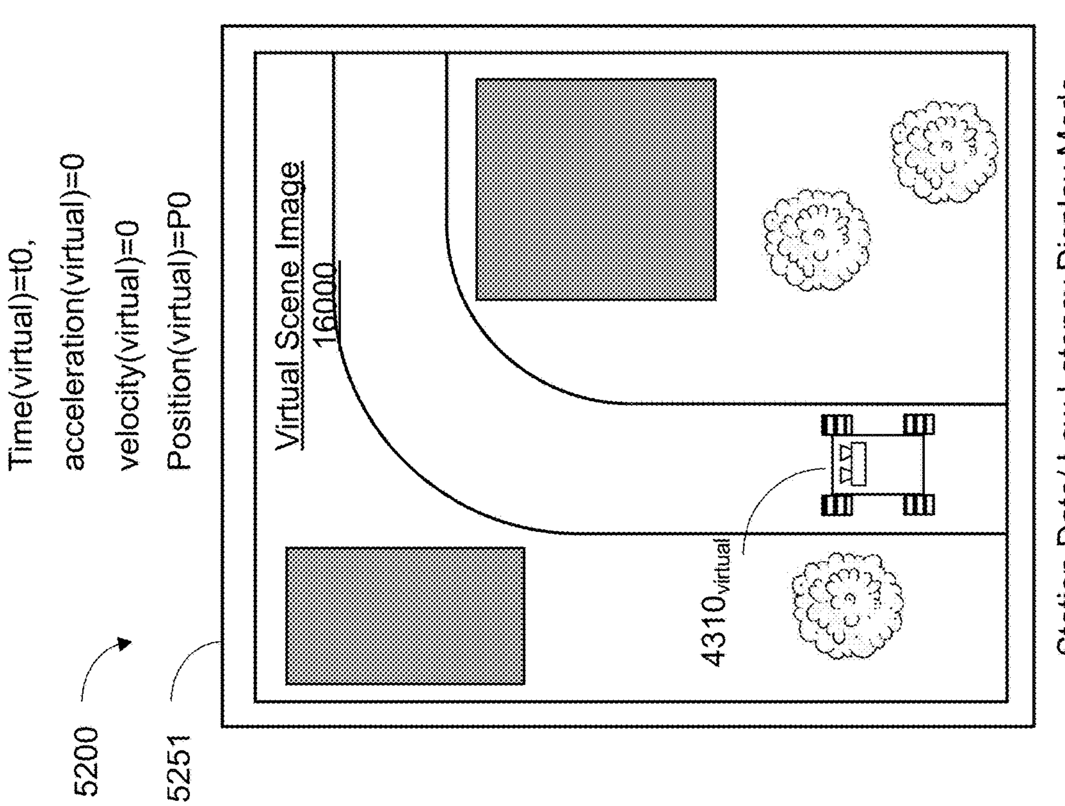
FIG. 10A is a schematic illustration of a scene.
FIG. 10B is a schematic low-latency mode representation of the scene shown in FIG. 10A.

Additional reference is made to FIGS. 10A and 10B. FIG. 10A shows a bird's eye view of a scenario of a real scene 15000 with various objects therein such as buildings, trees, a street, real carrier platform 4300 positioned in the environment (FIG. 10A). In the scenario shown in FIG. 10A the real carrier platform 4300 is shown, at time stamp t=t0, in a resting position P0 with velocity V0=0.

FIG. 10B shows a corresponding image of the scene displayed by display 5251 at the remote station to a user, in the station data display mode. It is noted that merely to simplify the discussion, the scene is illustrated as being presented to the user in corresponding bird's eye view presentation. However, this should by no means be construed in a limiting manner. Accordingly, additional or alternative views of scene may be displayed to the user, including, for example, immersive views through head-mounted displays (HMDs).

In FIG. 10B, the virtual scene image 16010 (of the station display mode) with a first virtual carrier platform 4310 displayed to the user by display 5251 for t=t0 at the remote station shows a situation which is identical or substantially identical to the situation in real scene 15000 at t=t0.

Figures 11A, 11B:
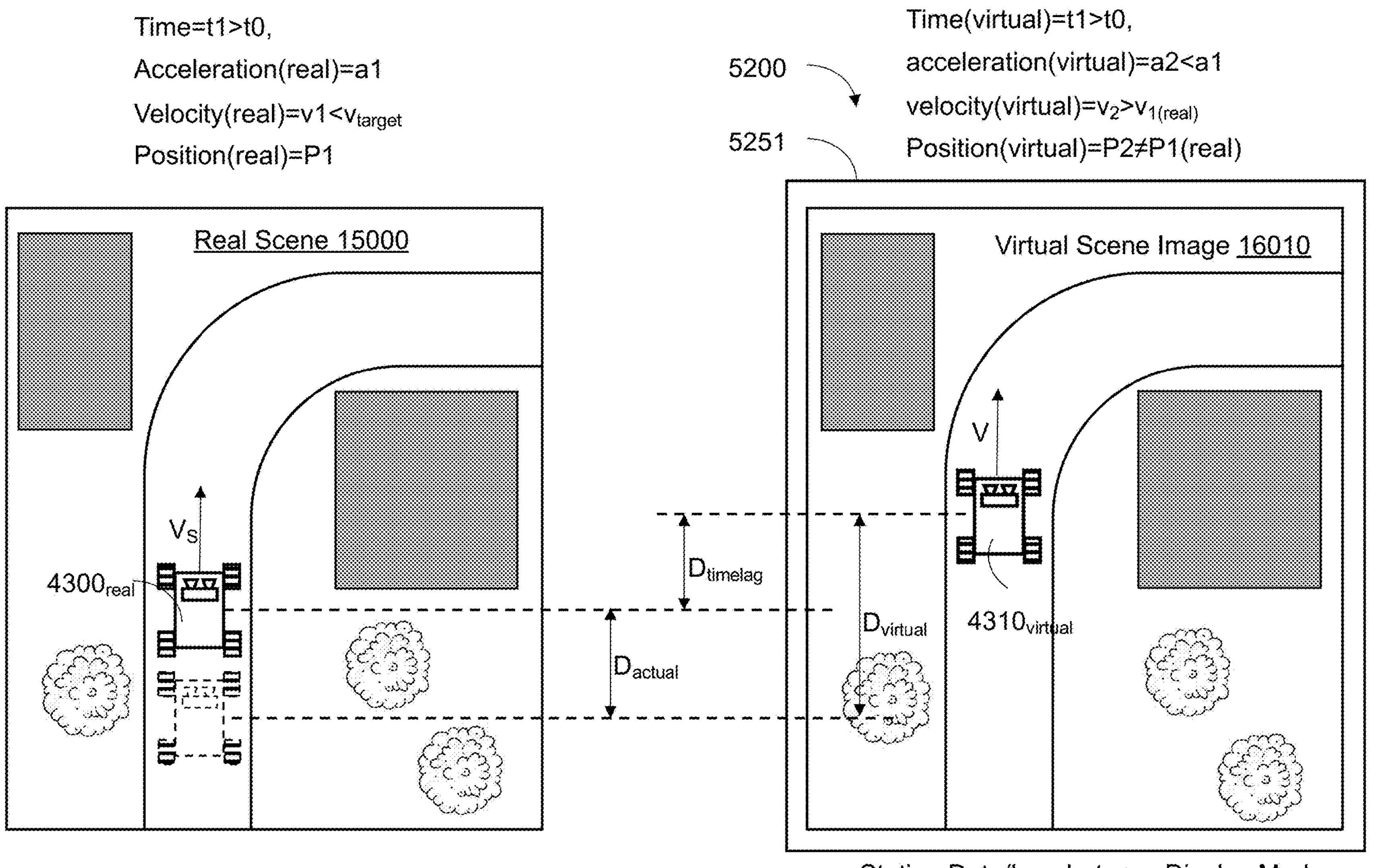
FIG. 11A is a further schematic illustration of the scene.
FIG. 11B is a schematic low-latency mode representation of the scene shown in FIG. 11A.

Additional reference is made to FIG. 11A. FIG. 11A shows real scene 15000 at time stamp t1>t0. A corresponding virtual scene image is shown in FIG. 11B for time stamp t=t1 in the station data display mode. In the present example, a control command has been provided at remote station 4200 at time stamp t=t0 to accelerate the carrier platform 4300 to obtain a velocity of V=Vtarget.

In FIG. 11B, the virtual scene image 16010 shows the virtual or desired position of the first virtual carrier platform 4310 at time stamp t=t1, as if there is no execution delay due to transmission of the control command from remote station 5200 to real carrier platform 4300 located in the scene, processing of the control command by real carrier platform 4300, and for sending back to remote station 5200 a feedback signal indicative of the execution of the command. Hence, command execution by the first virtual carrier platform 4310 by display 5251 to user in real time. In virtual scene image 16010, the virtual distance traversed by the first virtual carrier platform 4310 at t=t1 is schematically shown as $D_{virtual}$, since a2(virtual)<a1(real).

However, as shown schematically in shown FIG. 11A, because of the time required for transmitting the command from the remote station 5200 to real carrier platform 4300 and the time required to process the command, platform 4300 may only have traversed a distance $D_{actual}$ at timestamp t=t1 to arrive at first Position P1(real). Due to the command transmission and processing time, the actual distance $D_{actual}$ traveled by real carrier platform 4300 is shorter than the virtual distance $D_{virtual}$ shown as being traversed or travelled by the first virtual carrier platform 4310. The difference between the travelled distances $D_{ACTUAL}$ and $D_{VIRTUAL}$ is herein designated as $D_{timelag}$.

Figure 12B:
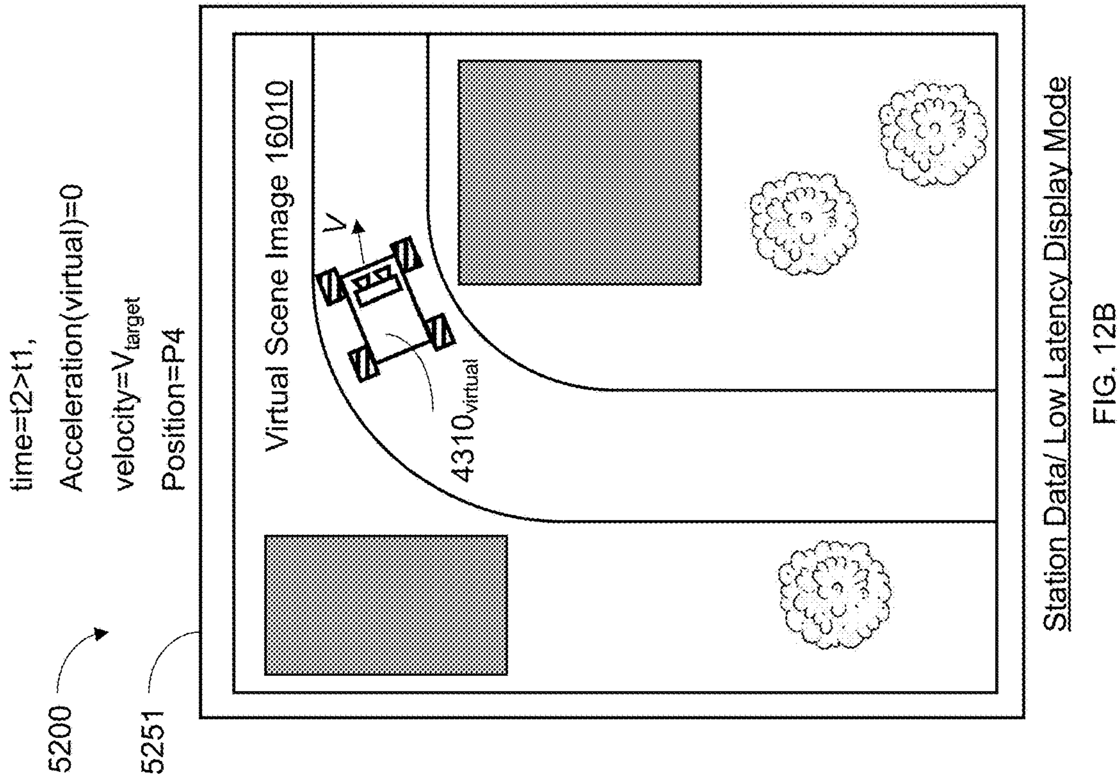
FIG. 12B is a schematic low-latency mode representation of the scene shown in FIG. 12A.
Figure 12A:
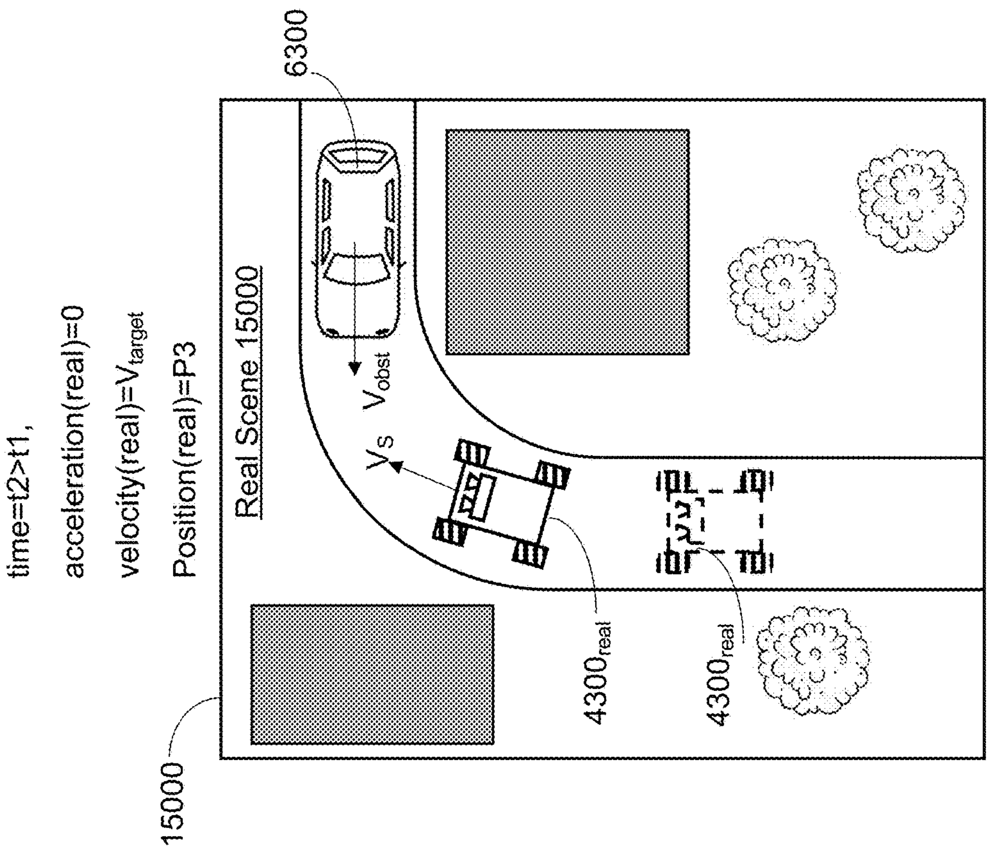
FIG. 12A is another schematic illustration of the scene.

Additional reference is made to FIG. 12A showing real carrier platform 4300 after it has traveled to second position P2(real) and after having reached the target velocity.

The real scene 15000 further shows the appearance of an oncoming vehicle 6300, which may pose an obstacle to real carrier platform 4300. Virtual scene image 16010 does not yet display oncoming vehicle 6300, e.g., due to latency in updating of virtual scene image 16010.

It is noted that in the scenario illustrated in FIG. 12A, real carrier platform 4300 has not yet engaged with obstacle 6300.

Referring to FIG. 12B, if the first virtual carrier platform 4310 was indeed at the virtual position P2(virtual), then the first virtual carrier platform 4310 was about to engage or would have already engaged with oncoming vehicle 6300. Hence, the situation shown in FIG. 12B in the station data display mode not only fails to accurately reflect the situation of the first virtual carrier platform 4310 in scene image 16010, but endangers also real carrier platform 4300. In other words, virtual scene image 16010 shown in FIG. 12B displays a false-negative situation with respect to obstacles to real-world carrier platform 4300 in real scene 15000.

Hence, to prevent a situation from happening in which for example a user controls the first virtual carrier platform 4310 in the station data display mode without knowledge of obstacle 6300 and thus may inadvertently maneuver real-world carrier platform 4300 into obstacle 6300, a scene data collector 4100 produces and transmits a command to remote station 5200 to display the actual situation occurring in real scene 15000 via remote display 5251 in the scene data display mode.

Figure 13B:
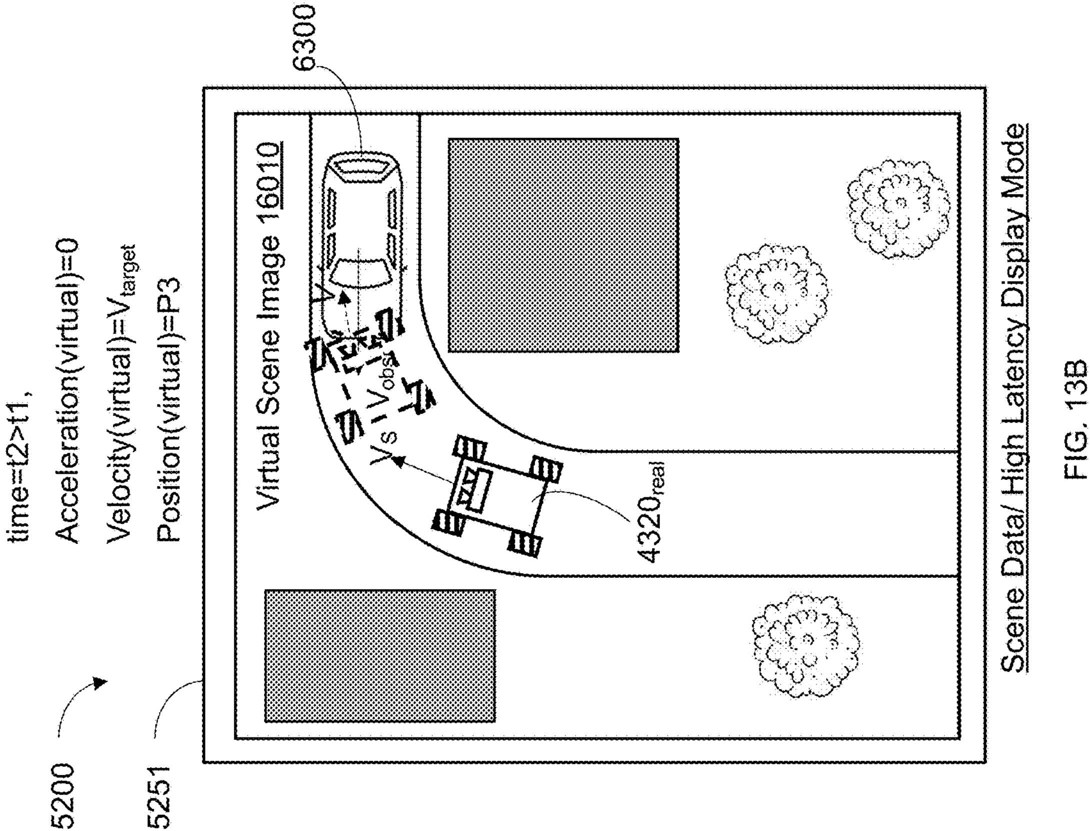
FIG. 13B is a schematic high-latency mode representation of the scene shown in FIG. 13A.
Figure 13A:
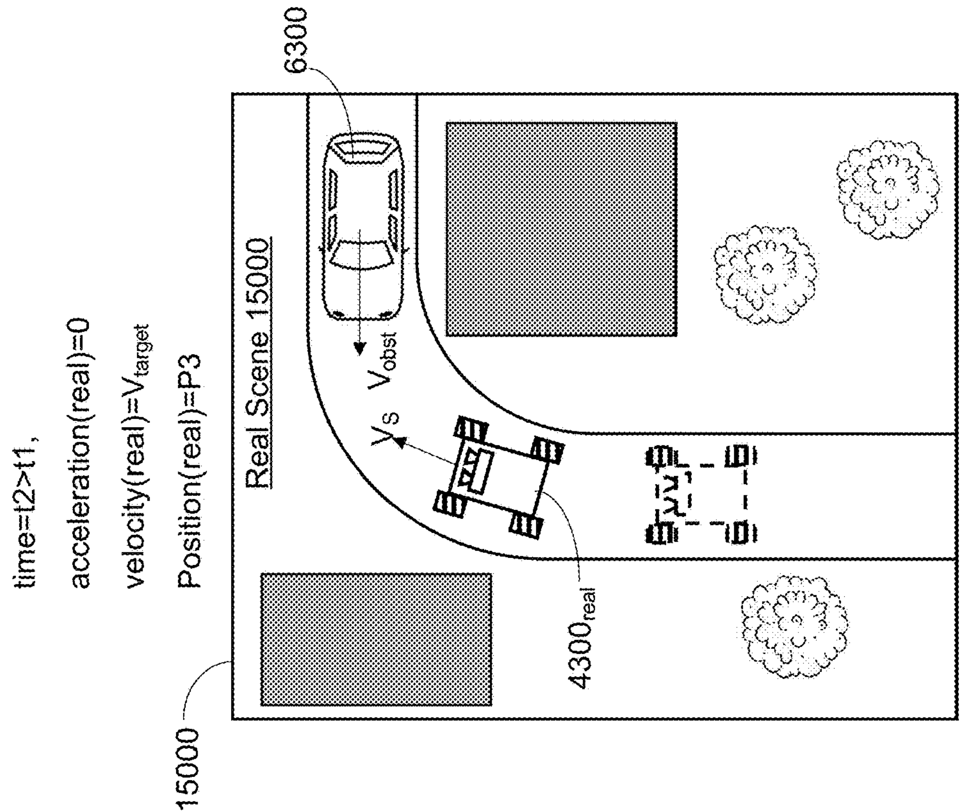
FIG. 13A is the schematic illustration of the scene shown in FIG. 12A.

The virtual scene image 16020 shown in FIG. 13B is reset, switches to or is overridden for displaying the scene data display mode, to correspond or substantially correspond with the real scene 15000 shown in FIG. 13A. Correspondingly, position of the first virtual carrier platform 4310 is reset from P2(virtual) to P3(virtual) or replaced by displaying a second virtual carrier platform 4320 in the station data display mode where P3(virtual) shown in FIG. 13B is identical or substantially identical with P3(real) of real carrier platform 6300 in real scene 15000 shown in FIG. 13A.

Upon replacing, resetting or repositioning the displayed position of the first virtual carrier platform 4310 to display in station display mode the second virtual carrier platform 4320, the time delays for transmitting and processing data for displaying at remote display 5251 the actual situation as it occurs in real scene 15000 are taken into consideration, optionally, at least until the (potential) obstacle(s) are removed from the real scene, and system can again render a virtual scene image 16020 which is analogous to the real scene 15000, without endangering the real carrier platform 4300.

Additional reference is made to FIGS. 14A-16B.

Figure 14B:
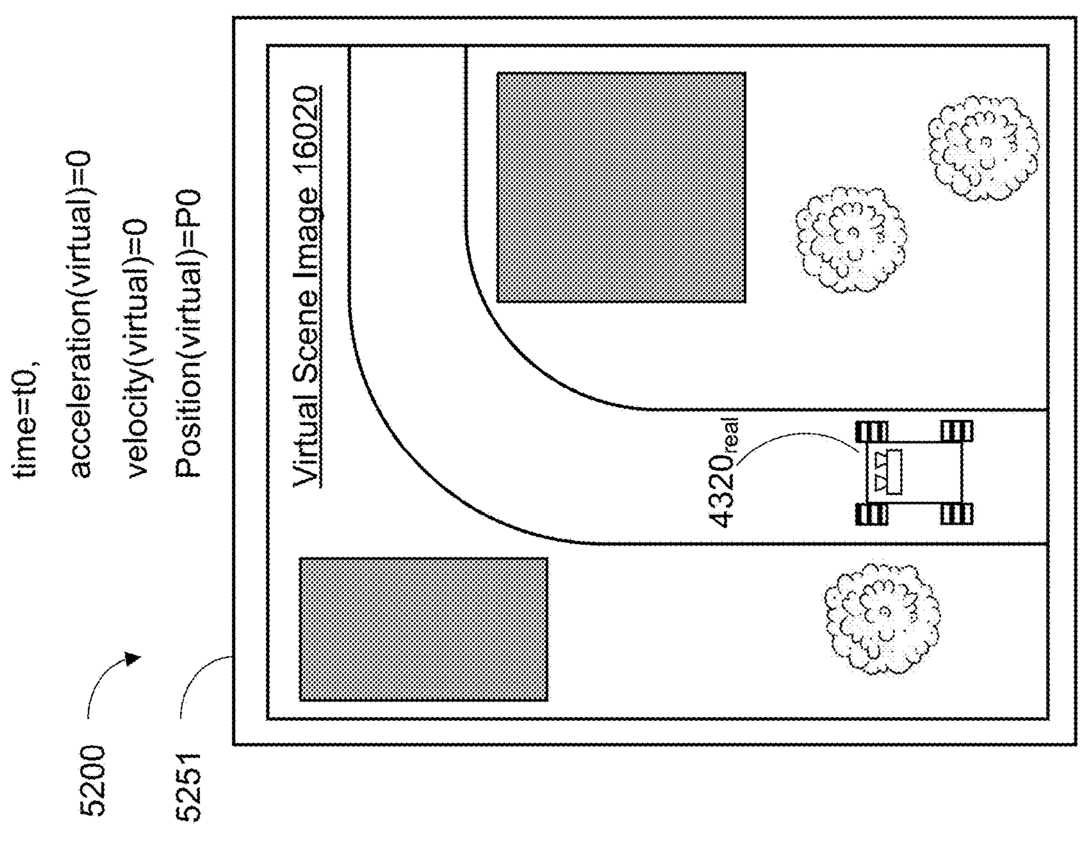
FIG. 14B is a schematic high-latency mode representation of the scene shown in FIG. 14A.
Figure 14A:
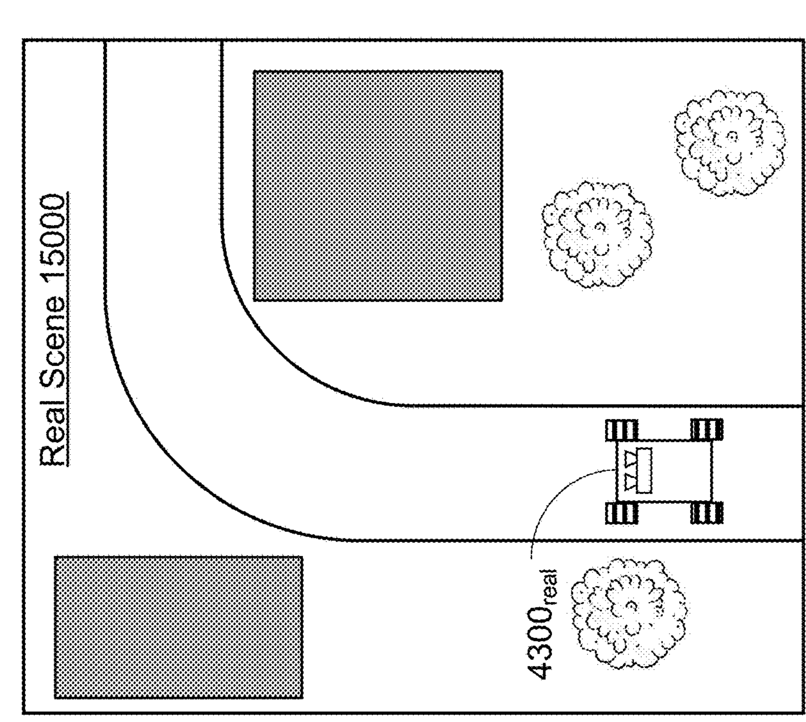
FIG. 14A is a schematic illustration of a scene.

FIG. 14A shows real scene 15000 alongside "latency-"virtual scene image 16020 of the scene data display mode, at t=t0.

Figures 15A, 15B:
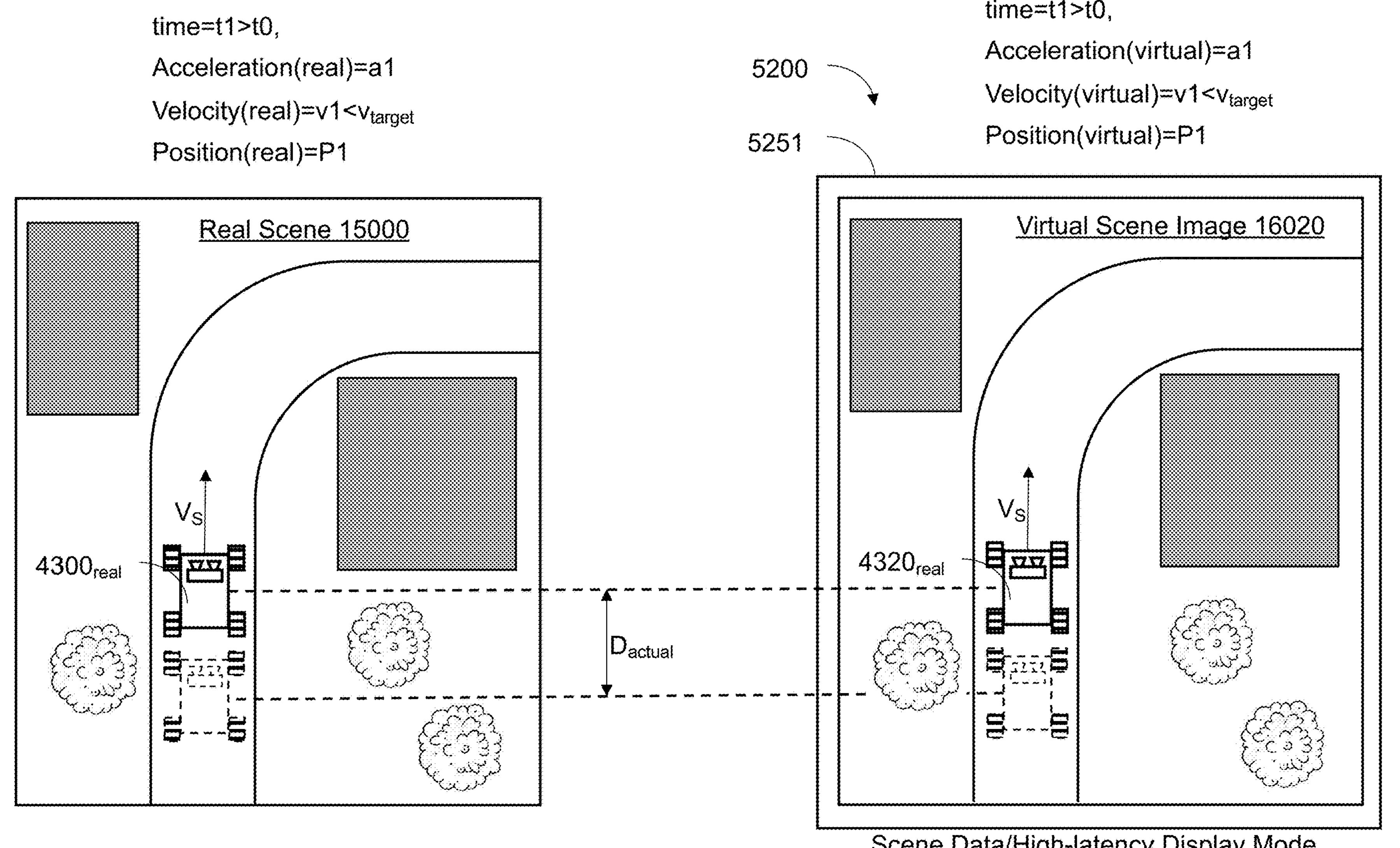
FIG. 15A is another schematic illustration of the scene.
FIG. 15B is a schematic high-latency mode representation of the scene shown in FIG. 15A.
Figure 16B:
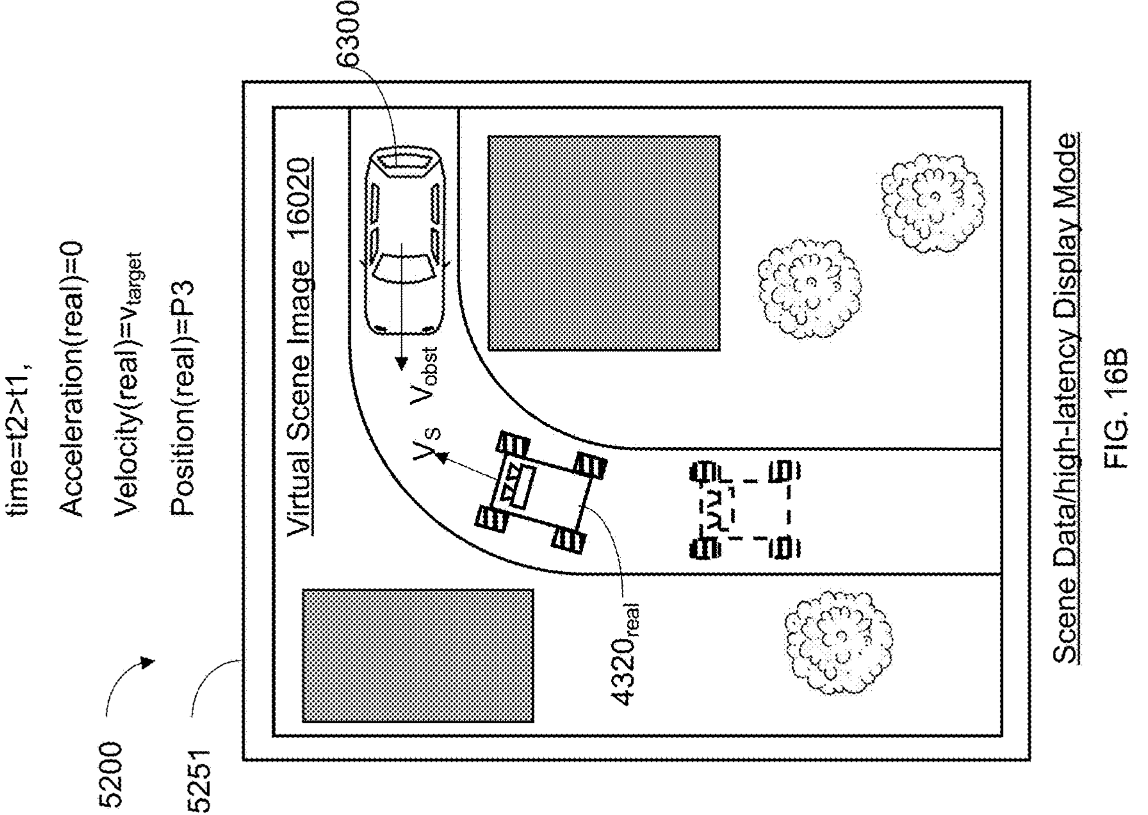
FIG. 16B is a schematic high-latency mode representation of the scene shown in FIG. 16A.
Figure 16A:
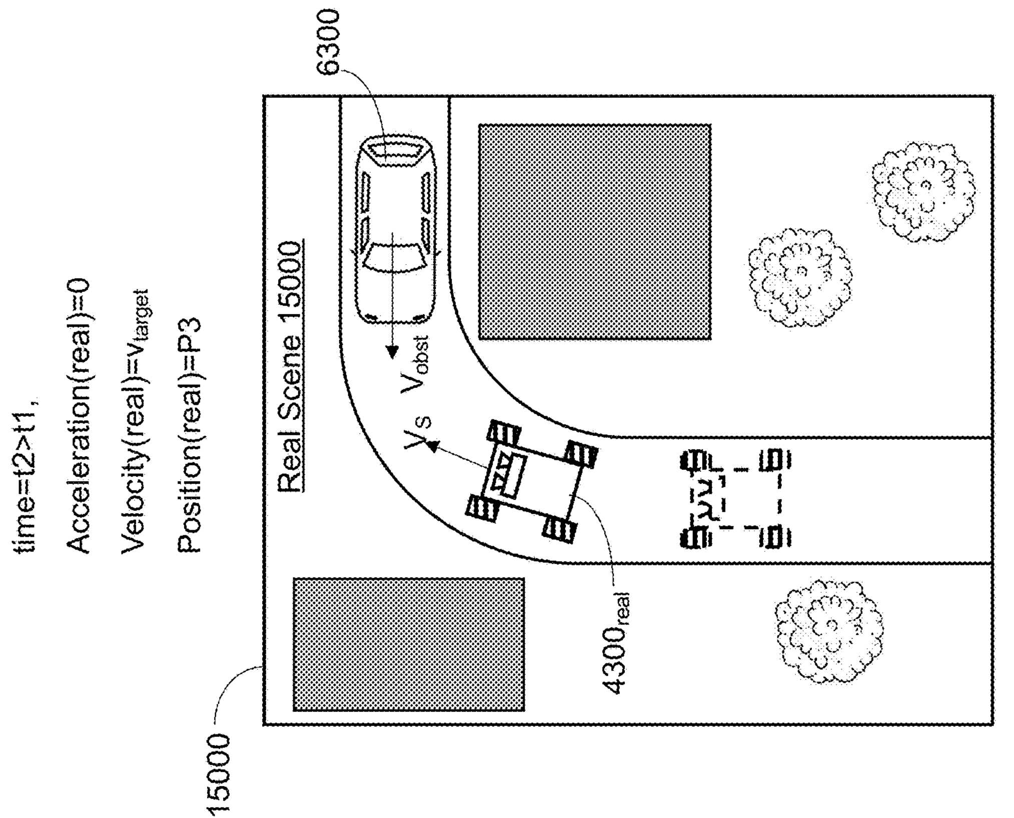
FIG. 16A is a yet other schematic illustration of the scene.

FIG. 15A shows real scene 15000 alongside virtual scene image 16020 of the scene data display mode, both at t=t1>t0.

In the scene data display mode, the system takes into consideration processing time and transmission delays when rendering the second virtual carrier platform 4320. Hence, the advancement of the second virtual carrier platform 4320 is shown in correspondence with the advancement of real carrier platform 4300. Hence, for time stamp t1, the real carrier platform 4300 and the second virtual carrier platform 4320 are both shown at the same corresponding positions P1. This is also schematically demonstrated in the FIGS. 16A and 16B, where at time stamp t=t2, both the real carrier platform 4300 and the second virtual carrier platform 4320 are shown at identical positions P2.

In some embodiments, a display mode may be automatically selected based on system latency. For example, the system may include a latency monitoring engine 9300 (cf. FIG. 9), for (e.g., constantly) determining and monitoring the system latency. Latency monitoring engine 9300 may be located at a remote station and/or in the scene. System latency may include network latency, data (e.g., command) processing latency, and/or command execution latency.

For example, if the system latency exceeds a high-latency threshold, display mode may switch from the scene data display mode to the station-data display mode, e.g., to maintain providing the user with the feel of zero-latency or lower latency.

For example, if the system latency exceeds a high-latency threshold, display mode may switch from the station data display mode to the scene data display mode, e.g., to reduce the probability of inadvertently causing damage to the real carrier platform.

For example, if the system latency drops below a low-latency threshold, display mode may switch from the station data display mode to the scene data display mode, e.g., to maintain providing the user with the feel of zero-latency or lower latency while reducing the probability to inadvertently cause damage to the real carrier platform.

For example, if the system latency drops below a low-latency threshold, display mode may switch from the scene data display mode to the station data display mode, as the low latency ensures comparatively low probability of to inadvertently cause damage to the real carrier platform in the station data display mode.

In some embodiments, the low-latency threshold and/or the high-latency threshold may be predetermined thresholds, or automatically adjusted dynamically or adaptively. Static thresholds are predetermined thresholds that remain constant. Dynamic thresholds are forcefully changed, for example, at a certain time of day, or a certain day of the year. Adaptive thresholds are changed, for example, in response to changes in characteristics of the network, and may vary depending on a variety of parameters. In some examples, the low-latency threshold and/or the high-latency threshold may be set manually, e.g., by the user of the system.

It is noted that the real-world carrier platform 4300 may be configured to navigate in the scene, e.g., based on control commands received from the remote station, and/or fully and/or partially autonomously, e.g., based on scene source data received by the real-world carrier platform 4300.

In some examples, real-world carrier platform 4300 may be configured to autonomously evade an obstacle in the scene. Autonomously evading an obstacle in the scene may include overriding a command input received, from the remote station, at the real-world carrier platform. The information displayed in the low-latency display mode is updated accordingly.

Some embodiments enable a user to perform a "sanity check" (also: validate) that information display validation, for example for validating that a desired data object is transmitted to the remote scene. This way, the user may for example validate that a visualization of a received data object indeed pertains to an ROI and/or target of interest (TOI). Merely to simplify the discussion that follows, without be construed in a limiting manner, descriptions of embodiments that pertain data object validation may refer to targets or (also: targets of interest).

As described herein, a remote station may receive at least one data object in relation to at least one identified attribute of one or more characteristics of one or more physical objects located in an ROI of the scene. Physical objects may be acquired by at least one sensor. An object priority level value (PLV) may be associated with the one or more physical objects based on the identified attribute. The system allows associating an object priority level value (PLV) with the one or more physical objects based on the identified attribute for providing at least one data object in relation to the at least one identified attribute of the one or more physical objects.

In some embodiments, the system allows generating, at the remote station, using local station data, a low-latency virtual model of the scene for displaying, at the remote station, a (composite) scene model comprising both the low-latency scene model and a visualization of the received data object (or of corresponding virtual scene data, e.g., as described herein). In examples where the scene model comprises both the low-latency scene model and a visualization of the received data object, the displayed scene information may herein be referred to as "(composite) low-latency scene visualization" or "composite low-latency scene model". In examples, where the scene model comprises only the low-latency scene model, the displayed scene information may herein be referred to as "low-latency scene visualization" or "low-latency scene model". To simplify the discussion that follows, the description herein may refer to both cases as "(composite) low-latency scene visualization" or "(composite) low-latency scene model".

For the purpose of performing information display validation, the system may allow a user to designate, on the (composite) low-latency scene model, an ROI and/or target ("ROI/target") (e.g., allow the user to designate a "preview window"). The system may then transmit to the remote station real-world scene data descriptive of real world ROI/Target information that corresponds or relates to the designated ROI/target for display thereof, for displaying information of the real-world scene data in the preview window. In some embodiments, the system may allow the user to close the preview window for displaying related data objects in accordance with the associated PLV.

In some examples, the real-world scene data relating to the selected ROI/target may be transmitted at the corresponding high-latency only in response to the user's designation of the ROI/target. In some other examples, real-world scene data may be continuously transmitted to the remote station, with the corresponding high-latency.

Based on the displayed real-world data information, the user may associate an updated PLV to the related object data; or associate a PLV to the real-world data. In accordance with the (updated) PLV, the system may then provide an (updated) data object to the remote station for display to the user. In some examples, the (updated) data object may be provided based on the (updated) PLV and the communication limitations for transmitting the (updated) data object to the remote station.

Figure 17:
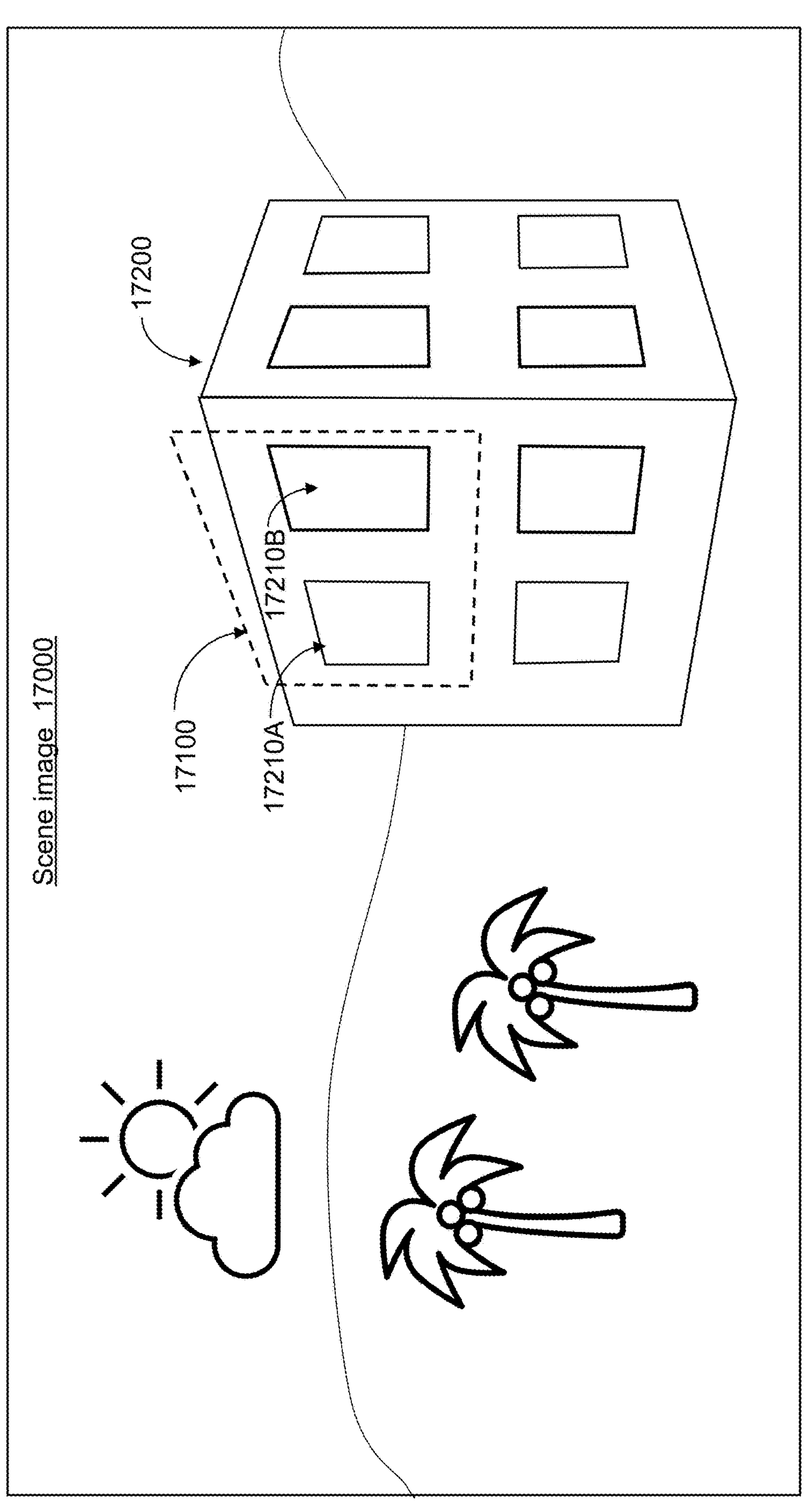
FIG. 17 is schematic illustration of a scene and of a designated ROI/target in the scene, according to some embodiments.

Reference is now made to FIG. 17. In some examples, a scene representation 17000 may be synthesized fully or partially using locally available data that is readily available for image synthetization at the remote station, for example, using data that does not need to be transmitted from the scene to the remote station for image generation. In some examples, the scene representation 17000 may be generated using such locally available data and further be based on data objects transmitted from the scene.

In some embodiments, the scene representation 17000 may be entirely composed of data objects transmitted from the scene. In some examples, the scene representation 17000 may also include real-world scene information provided, for example, a high-quality video feed.

As described herein, the at least one data object is provided from the scene in relation to at least one attribute of one more physical objects located in an ROI of the scene. Optionally, the at least one data object is provided in accordance with a PLV and/or communication limitations (e.g., latency, bandwidth) for transmitting the at least one data object to the remote station.

As schematically illustrated in FIG. 17, a user may designate or select an ROI and/or target displayed in scene representation 17000. In some examples, the user may draw an area 17100 for designating a corresponding ROI/target. The target/ROI designation or selection may be performed by the user at the remote station via a suitable interface, e.g., a touch screen, a pointer device (e.g., mouse), and/or the like. In the example shown in FIG. 17, the user chose to select two building openings 17210 (windows 17210A and 17210B of a building 17200 shown in the scene representation 17000. In some examples, the windows 17210 may be represented by data objects. In some other examples, the windows 17210 may be represented by locally available data.

Figure 18:
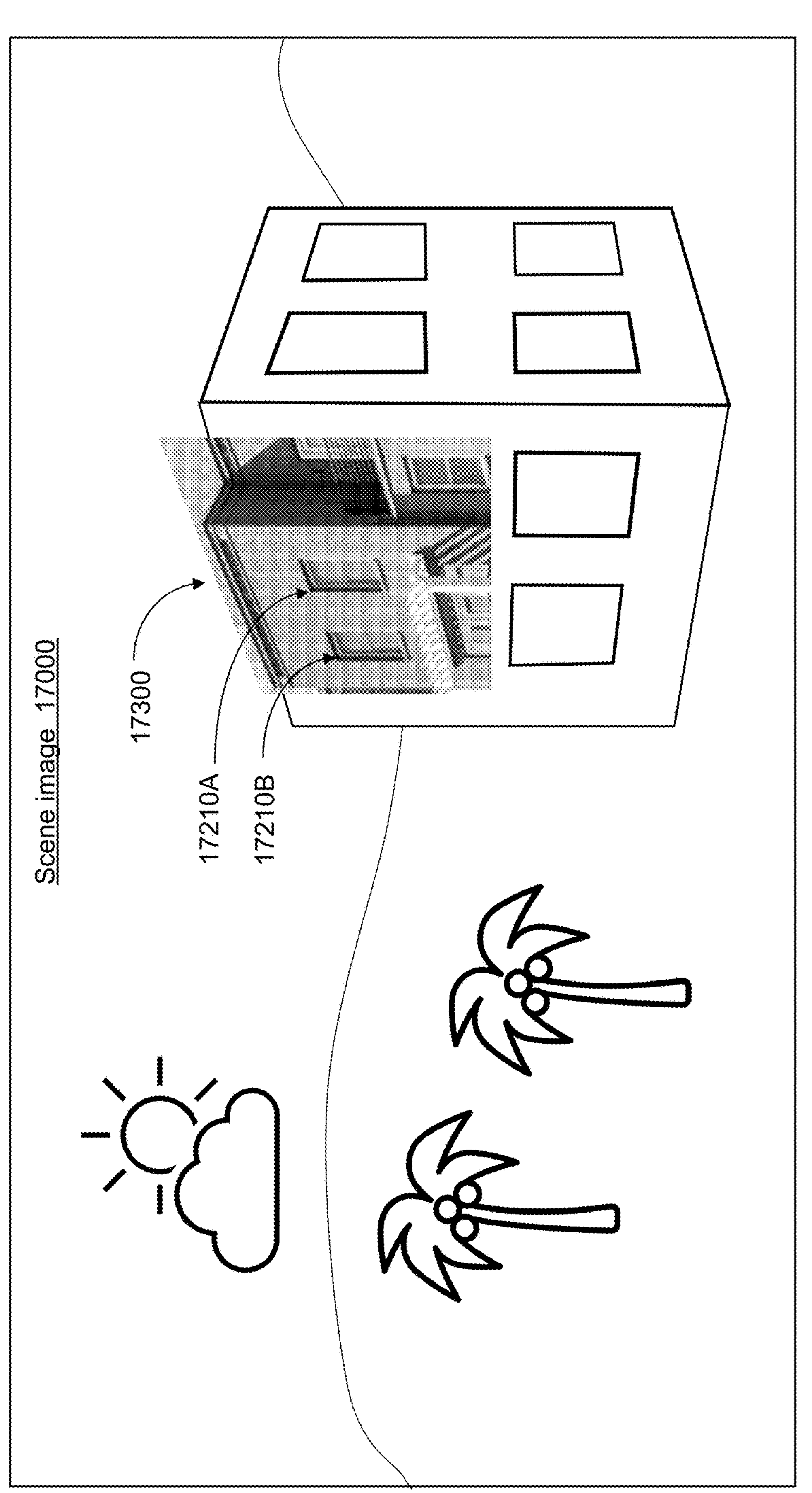
FIG. 18 is a schematic illustration of the scene shown in FIG. 17, where the designated ROI/target is displayed with real-world data.

Additional reference is now made to FIG. 18. Following the selection made of building openings 17210 as target/ROI, the system may display a high-quality video feed of the selected ROI/targets acquired at the scene, schematically illustrated in FIG. 18 by real-world image 17300 schematically representing a video feed of the corresponding real-world building openings 17300 acquired by image sensors.

Depending on the real-world information displayed, the user may confirm a present PLV associated with the ROI/targets 17210, or update the present PLV to a new PLV. In scenarios where no PLV is associated with the ROI/targets 17210, the user may designate a PLV to the ROI/targets 17210. Based on the PLV (optionally newly) associated with the ROI/target, the system may then provide the at least one data object for transmission to the remote station for display in the scene representation.

In one example, based on an increase in the PLV value, the system may continue providing a high-quality video feed of the ROI/targets 17210 only. In another example, due to a decrease in the PLV value, the system may alter the data objects to reduce the required bandwidth, for example, by replacing a low-quality video feed with tags or schematic graphical representations of the ROI/target.

In some examples, information may be displayed to the user regarding any obstacle in the scene to the real-world carrier platform, e.g., in the low-latency display mode and/or the high-latency display mode, along with possible actions to be or currently being undertaken to evade the obstacle.

In some examples, the system may be configured to allow selecting at least one portion of the at least one ROI for displaying the selected portion of the at least one ROI at the remote station at higher resolution compared to a non-selected portion.

In some examples, the method and/or system may allow selecting at least one portion of the at least one ROI for displaying the selected portion of the at least one ROI at the remote station at zero latency or lower latency compared to a non-selected portion.

In some examples, the method and/or system may be configured to identify an object type of the designated ROI/target.

In some examples, the object type can be one of a moving and non-moving object type.

In some examples, the object type can be one of a high-interest and low-interest object type.

Example 1 is a method for providing scene related information, the method comprising:

- (a) receiving scene source data, originating from one or more data sources comprising at least one sensor configured to acquire at least one physical characteristic of a scene occurring in a region of interest (ROI), the scene source data being associated with a respective acquisition time;
- (b) identifying one or more physical objects located in the ROI, based on the received scene source data;
- (c) determining one or more attributes for the identified one or more physical objects;
- (d) generating a data object, for at least one of the identified one or more physical objects, based on one or more attributes thereof, wherein the generated data object is associated with a single identified physical object;
- (e) transmitting (e.g., all) data objects generated in relation to the received scene source data to at least one remote station, located remotely from the ROI;
- (f) receiving one or more data objects at the at least one remote station;
- (g) generating a virtual scene data, based on the received one or more data objects; and, for example,
- (h) displaying the virtual scene data, using one or more display devices of the respective remote station.

In example 2, the subject matter of example 1 may include, wherein steps a-h are executable in real time (RT) or near RT, in respect to the time of receiving the scene source data and/or in respect to the acquisition time of the respective scene source data.

In example 3, the subject matter of any one or more of examples 1 to 2, may include, wherein the data object of a respective identified physical object comprises one or more of: one or more attributes of the respective identified physical object; data portions from the scene source data that are associated with the respective identified physical object; one or more modified data portions from the scene source data that are associated with the respective identified physical object.

In example 4, the subject matter of any one or more of examples 1 to 3 may include, wherein the one or more attributes determined for each identified physical object comprise one or more of: object type, object identity, one or more characteristics of the respective identified physical object, object's prioritization level value (PLV).

In example 5, the subject matter of example 4 may include, wherein the one or more characteristics of the respective identified physical object comprises one or more of: object geometry, object shape, object speed, object acceleration rate, object texture, object dimensions, object material composition, object movement, object's optical characteristics, object's contours, and/or object's borders.

In example 6, the subject matter of any one or more of examples 1 to 5, wherein the method may further comprise selecting one or more of the identified physical objects that are of interest, using one or more objects selection criteria, wherein the one or more objects selection criteria is based on the attributes of each of the one or more identified physical objects, wherein the generating of data objects and transmission thereof is carried out, (e.g., only) for the selected one or more identified physical objects.

In example 7, the subject matter of example 6 may include, wherein selection of the one or more of the identified physical objects that are of interest, is carried out by detecting changes in one or more attributes of the identified physical object.

In example 8, the subject matter of any one or more of examples 6 to 7, wherein the method may further comprise identifying, for the selected identified physical object, one or more data portions from the scene source data that are associated therewith and modifying the identified data portion, wherein the modification reduces the data size of the respective data portion, generating a size-reduced modified data portion at least as part of the respective data object.

In example 9, the subject matter of any one or more of examples 1 to 8, wherein the method may further comprise determining a transmission rate of each generated data object, and transmitting the respective data object, according to the determined transmission rate thereof.

In example 10, the subject matter of example 9 may include, wherein the transmission rate of the respective data object is determined based on one or more of: communication definitions, requirements and/or limitations; one or more attributes of the physical object of the respective data object.

In example 11, the subject matter of any one or more of examples 1 to 10 may include, wherein steps a-e are carried out via a scene data collector (SDC) located remotely from the at least one remote station.

In example 12, the subject matter of example 11, wherein the method may further comprise remotely controlling a carrier platform, configured to carry thereby any one or more of: the SDC, the one or more sensors, one or more controllable operational devices.

In example 13, the subject matter of example 12 may include, wherein the remotely controllable carrier platform comprises one or more of: a remotely controllable vehicle, a remotely controllable holding platform.

In example 14, the subject matter of example 13 may include, wherein of the RS is configured to control at least one of: the carrier platform; operation of the at least one sensor; communication between the remote station and the SDC; the SDC; the one or more controllable operational devices; the one or more sensors.

In example 15, the subject matter of any one or more of examples 11 to 14 may include, wherein the remotely controllable carrier platform is controlled by generating, in RT or near RT, based on the received one or more data objects, one or more control commands and transmission thereof from the RS to the remotely controllable carrier platform and/or to the SDC, in RT or near RT, in respect to the generation of the one or more control commands.

In example 16, the subject matter of any one or more of examples 1 to 15, wherein the method may further comprise identifying one or more background data objects from the scene source data, determining attributes thereof and transmitting at least one of the identified one or more background data objects.

In example 17, the subject matter of any one or more of examples 1 to 16 may include, wherein the step of determining one or more attributes of each identified physical object, comprises determining a prioritization level value (PLV) attribute for each identified physical object, based on one or more other attributes of the respective physical object, determined based on analysis of the received scene source data, using one or more PLV assignment criteria.

In example 18, the subject matter of example 17, wherein the method may further comprise selecting one or more identified physical objects having a PLV object data of identified physical objects having a PLV that exceeds a predefined PLV threshold and generating and transmitting only data objects of selected identified physical objects.

In example 19, the subject matter of any one or more of examples 1 to 18, wherein the method may further comprise: retrieving additional information associated with the respective ROI from at least one database, wherein the generating of the virtual scene data is carried out based on the received one or more data objects as well as on the retrieved additional information.

In example 20, the subject matter of example 19, wherein the method may further comprise: identifying changes in one or more received data objects, in respect to previously saved information associated with each respective data object; and updating the at least one database upon identification of changes in the one or more data objects.

In example 21, the subject matter of any one or more of examples 1 to 20, wherein the method may further comprise sensing the one or more physical characteristics of the scene and outputting sensor data indicative thereof, wherein the scene source data comprises the outputted sensor data and/or data deduced from the sensor data.

In example 22, the subject matter of any one or more of examples 1 to 20 may include, wherein the virtual scene data comprises two-dimensional (2D), three-dimensional (3D) visual display data and/or auditory display data, enabling 2D and/or 3D visual and/or auditory virtual reality display at the remote station.

In example 23, the subject matter of any one or more of examples 1 to 22 may include, wherein the generation and/or displaying of the virtual scene data is carried out also based on RT or near RT control input.

In example 24, the subject matter of example 23 may include, wherein the one or more display devices is configured for automatic or user controllable display.

In example 25, the subject matter of example 24 may include, wherein the remote station comprises one or more sensors, sensing one or more physical characteristics of a user viewing the displayed virtual scene data, the sensors being configured to output user sensor data indicative of the sensed physical characteristics of the user, wherein the controlling of the display in RT or near RT is further based on the outputted user sensor data.

In example 26, the subject matter of example 25 may include, wherein the sensors and the one or more display devices are embedded in a simulation subsystem.

Example 27 is a system for providing scene related information, the system may comprise:

at least one scene data collector (SDC) configured to: (i) receive scene source data of a scene occurring in a region of interest (ROI) associated with a specific scene time, the scene source data originating from one or more data sources comprising at least one sensor configured to acquire at least one physical characteristic of the scene, the scene source data being associated with a respective acquisition time; (ii) identify one or more physical objects located in the ROI, based on the received scene source data; (iii) determine one or more attributes of the identified one or more physical objects; (iv) generate a data object, for at least one of the identified one or more physical objects, based on one or more attributes thereof, wherein the data object is associated with a single identified physical object; and (v) transmit (e.g., all) data objects generated in relation to the respective received scene source data to at least one remote station, located remotely from the ROI;

at least one remote station, configured to: (i) receive data objects associated with a scene from each SDCs; (ii) generate virtual scene data, based on the received one or more data objects of the respective scene and scene time; and, for example, (iii) displaying the generated virtual scene data, using one or more display devices of the respective remote station.

In example 28, the subject matter of example 27 may include, wherein the SDC is configured to identify the physical object, determine their attributes and generate the data objects based thereon, in real time (RT) or near real time (near RT), in respect to the time of receiving the scene source data and/or in respect to the acquisition time of the respective scene source data.

In example 29, the subject matter of any one or more of examples 27 to 28 may include, wherein the data object of a respective identified physical object comprises one or more of: one or more attributes of the respective identified physical object; data portions from the scene source data that are associated with the respective identified physical object; one or more modified data portions from the scene source data that are associated with the respective identified physical object.

In example 30, the subject matter of any one or more of examples 27 to 29 may include, wherein the one or more attributes determined for each identified physical object comprise one or more of: object type, object identity, one or more characteristics of the respective identified physical object, object's prioritization level value (PLV).

In example 31, the subject matter of example 30 may include, wherein the one or more characteristics of the respective identified physical object comprises one or more of: object geometry, object shape, object speed, object acceleration rate, object texture, object dimensions, object material composition, object movement, object's optical characteristics, object borders, and/or object contours.

In example 32, the subject matter of any one or more of examples 27 to 31 may include, wherein the SDC comprises one or more of:

an SDC communication unit, configured to communicate with the at least one remote station via one or more communication links;

an SDC sensors unit, configured to communicate with the at least one sensor, process sensor data, generate scene source data based thereon and/or control sensors operation;

an SDC processing unit, configured to receive the scene source data, process the received scene source data, for physical objects identification and their attributes determination, and generate, based on the attributes of each identified physical object their respective data objects; and/or an SDC memory unit configured for data storage and/or retrieval.

In example 33, the subject matter of any one or more of examples 27 to 32, wherein the system may further comprise a remotely controllable carrier platform, configured for carrying any one or more of: the SDC; the at least one sensor; one or more operational devices, wherein the at least one remote station is configured for remotely controlling any one or more of: the SDC; the carrier platform; the at least one sensor; and/or the one or more operational devices.

In example 34, the subject matter of example 33 may include, wherein the remote station is configured to control any one or more of the SDC, the at least one sensor and/or the one or more operational devices, via the SDC, by having the SDC configured to receive operational control commands from the remote station and control thereof and/or any one or more of: the at least one sensor and/or the one or more operational devices, based on control commands arriving from the at least one remote station.

In example 35, the subject matter of any one or more of examples 33 to 34 may include, wherein controlling the remotely controllable platform comprises at least one of:

controlling positioning and/or location of the remotely controllable carrier platform;

controlling operation of the at least one sensor;

controlling communication between the remote station and the SDC;

controlling the SDC; and/or controlling the one or more controllable operational devices.

In example 36, the subject matter of any one or more of examples 33 to 35 may include, wherein the carrier platform comprises one or more of: a remotely controllable vehicle, a remotely controllable holding platform.

In example 37, the subject matter of any one or more of examples 27 to 36 may include, wherein the remote station (RS) comprises:

a user interface (UI), configured for receiving and/or generating user data;

at least one user sensor, configured to sense one or more user physical characteristics and generate user data based thereon;

a RS communication unit, configured to communicate with one or more SDCs with the at least one sensor, and/or the at least one user sensor;

a RS scene display logic, configured to receive the data objects, process thereof, generate virtual scene data based thereon, and controllably display the generated virtual scene data, based on received user data; and a RS memory unit, configured to retrievably store data therein.

In example 38, the subject matter of example 37 may include, wherein the RS further comprises a simulator subsystem embedding at least the at least one display device, the at least one user sensor and/or UI therein, wherein the simulator subsystem is configured for first person view (FPV) display of the virtual scene data, responsive to received user data.

In example 39, the subject matter of example 38 may include, wherein the simulator subsystem comprises one or more of: a head mounted display (HMD) device having the at least one user sensor and display device embedded therein, wherein the user data is derived from sensor output data.

In example 40, the subject matter of any one or more of examples 37 to 39 may include, wherein the RS is further configured to retrieve additional information associated with the respective ROI from at least one information source, wherein the generating of the virtual scene data is carried out based on the received one or more data objects as well as on the retrieved additional information.

In example 41, the subject matter of example 42 may include, wherein the at least one information source comprises an external information source and/or at least one RS database.

In example 42, the subject matter of any one or more of examples 27 to 41 may include, wherein the one or more attributes determined for each identified physical object, comprises a prioritization level value (PLV) attribute wherein the determining of the PLV of each respective identified physical object is carried out, based on one or more other attributes of the respective identified physical object, using one or more PLV assignment criteria.

In example 43, the subject matter of example 42 may include, wherein the generation of the data objects is carried out by selecting one or more identified physical objects having a PLV object data of identified physical objects having a PLV that exceeds a predefined PLV threshold and generating and transmitting only data objects of selected identified physical objects.

In example 44, the subject matter of any one or more of examples 27 to 43 may include, wherein the virtual scene data comprises two-dimensional (2D), three-dimensional (3D) visual display data and/or auditory display data, enabling 2D and/or 3D visual and/or auditory virtual reality display at the remote station.

Example 45 concerns a system for providing scene related information from a real scene including at least one real carrier platform, to a remote station, the system comprising: at least one memory configured to store data and program code instructions; and at least one processor configured to execute program code instructions stored in the memory to result in the following steps:

receiving, after a downlink transmission latency, at the remote station, real-world scene data from the real scene;

generating, at the remote station, based on the received real-world scene data, at least one high-latency virtual carrier platform model and a high-latency virtual scene model descriptive of surroundings of the at least one real world carrier platform; and generating, at the remote station, using local station data dispensable of the received real-world scene data, at least one low-latency virtual carrier platform model and a low-latency virtual scene model descriptive of surroundings of the real world carrier platform.

Example 46 includes the subject matter of example 45 and, optionally, wherein the steps further comprise displaying scene information in one of or both a high-latency display mode or a low display mode, wherein the high-latency display mode includes displaying, at the remote station, the at least one high-latency virtual carrier platform model and the high-latency first virtual scene model, and wherein the low-latency display mode includes displaying, at the remote station, the at least one low-latency virtual carrier platform model and the low-latency virtual scene model.

Example 47 includes the subject matter of example 46 and, optionally, wherein the steps further comprise:

determining, based on the received real-world scene data, whether an object in the real-world scene poses an obstacle to the real-world carrier platform; and displaying the high-latency display mode in the event that an object is identified as an obstacle to the real-world carrier platform.

Example 48 includes the subject matter of example 47 and, optionally, wherein the steps further include discontinuing displaying of the low-latency display mode, at least until the object does not pose an obstacle to the real-world carrier platform.

Example 49 includes the subject matter of example 46 and, optionally, wherein the steps further include concurrently displaying the low-latency display mode and the high-latency display mode, e.g., in juxtaposition or in overlay.

Example 50 includes the subject matter of example 46 and, optionally, wherein the steps further comprise determining a latency of the system; and wherein the selecting of a display mode is based on the determined system latency.

Example 51 includes the subject matter of example 46 and, optionally, wherein the steps comprise switching from the high-latency display to the low-latency display mode, if the system latency exceeds a high-latency threshold.

Example 52 includes the subject matter of example 46 and, optionally, wherein the steps comprise switching from the low-latency display to the high-latency display mode, if the system latency exceeds a high-latency threshold.

Example 53 includes the subject matter of example 46 and, optionally, wherein the steps comprise switching from the low-latency display mode to the high-latency display mode, if the system latency drops below a low-latency threshold.

Example 54 includes the subject matter of example 46 and, optionally, wherein the steps comprise switching from the high-latency display mode to the low-latency display mode if the system latency drops below a low-latency threshold.

Example 55 includes the subject matter of any one or more of the examples 45 to 54 and, optionally, wherein the generating of the at least one low-latency virtual carrier platform model and the low-latency virtual scene model is based mostly or entirely on the processing of locally available station data.

Example 56 includes the subject matter of any one or more of the examples 45 to 55 and, optionally, wherein the steps comprise, prior to receiving real-world scene data, the uplink transmission of a control command from the remote station to the real-world carrier platform, wherein the uplink transmission has an uplink transmission latency.

Example 57 includes the subject matter of example 56 and, optionally, wherein the received real-world scene data is received responsive to sending a control command to the at least one real-world carrier platform.

Example 58 includes the subject matter of any one or more of the examples 45 to 57 and, optionally, wherein the real-world scene data originates from one or more data sources comprising at least one sensor configured to acquire at least one physical characteristic of a scene occurring in a region of interest (ROI), the scene source data being associated with a respective acquisition time;

wherein the steps further comprise:

identifying, based on the real-world scene data, one or more physical objects located in the ROI;

determining at least one attribute of the identified one or more physical objects;

generating a data object, for at least one of the identified one or more physical objects, based on one or more attributes thereof, wherein each data object is associated with a single identified physical object;

transmitting the data objects generated in relation to the respective received scene source data to at least one remote station (RS), located remotely from the ROI;

receiving, at the at least one remote station, one or more data objects; and generating, based on the received one or more data objects, virtual scene data.

Example 59 pertains to a method for providing scene related information from a real scene including at least one real carrier platform, to a remote station, the method comprising:

receiving, after a downlink transmission latency, at the remote station, real-world scene data from the real scene;

generating, at the remote station, based on the received real-world scene data, at least one high-latency virtual carrier platform model and a high-latency virtual scene model descriptive of surroundings of the at least one real world carrier platform; and generating, at the remote station, using local station data dispensable of the received real-world scene data, at least one low-latency virtual carrier platform model and a low-latency virtual scene model descriptive of surroundings of the real world carrier platform.

Example 60 includes the subject matter of example 59 and, optionally, further comprising selecting one of or both a high-latency display mode or a low display mode, wherein the high-latency display mode includes displaying, at the remote station, the at least one high-latency virtual carrier platform model and the high-latency first virtual scene model, and wherein the low-latency display mode includes displaying, at the remote station, the at least one low-latency virtual carrier platform model and the low-latency virtual scene model.

Example 61 includes the subject matter of example 60 and, optionally, wherein the steps further comprise:

determining, based on the received real-world scene data, whether an object in the real-world scene poses an obstacle to the real-world carrier platform; and displaying the high-latency display mode in the event that an object is identified as an obstacle to the real-world carrier platform.

Example 62 includes the subject matter of example 61 and, optionally, wherein the steps further include discontinuing displaying of the low-latency display mode, at least until the object does not pose an obstacle to the real-world carrier platform.

Example 63 includes the subject matter of example 60 and, optionally, wherein the steps further include concurrently displaying the low-latency display mode and the high-latency display mode.

Example 64 includes the subject matter of example 60 and, optionally, wherein the steps further comprise determining a latency of the system; and wherein the selecting of a display mode is based on the determined system latency.

Example 65 includes the subject matter of example 60 and, optionally, wherein the steps comprise switching from the high-latency display to the low-latency display mode, if the system latency exceeds a high-latency threshold.

Example 66 includes the subject matter of example 60 and, optionally, wherein the steps comprise switching from the low-latency display to the high-latency display mode, if the system latency exceeds a high-latency threshold.

Example 67 includes the subject matter of example 60 and, optionally, wherein the steps comprise switching from the low-latency display mode to the high-latency display mode, if the system latency drops below a low-latency threshold.

Example 68 includes the subject matter of example 60 and, optionally, wherein the steps comprise switching from the high-latency display mode to the low-latency display mode if the system latency drops below a low-latency threshold.

Example 69 includes the subject matter of any one or more of the examples 59 to 68, and, optionally, wherein the generating of the at least one low-latency virtual carrier platform model and the low-latency virtual scene model is based mostly or entirely on the processing of locally available station data.

Example 70 includes the subject matter of any one or more of the examples 59 to 69, wherein the steps comprise, prior to receiving real-world scene data, the uplink transmission of a control command from the remote station to the real-world carrier platform, wherein the uplink transmission has an uplink transmission latency.

Example 71 includes the subject matter of any one or more of examples 59 to 70, optionally, wherein the received real-world scene data is received responsive to sending a control command to the at least one real-world carrier platform.

Example 72 includes the subject matter of any one or more of examples 59 to 71 and, optionally, wherein the real-world scene data originates from one or more data sources comprising at least one sensor configured to acquire at least one physical characteristic of a scene occurring in a region of interest (ROI), the scene source data being associated with a respective acquisition time; wherein the steps further comprise:

- identifying, based on the real-world scene data, one or more physical objects located in the ROI;
- determining at least one attribute of the identified one or more physical objects;
- generating a data object, for at least one of the identified one or more physical objects, based on one or more attributes thereof, wherein each data object is associated with a single identified physical object;
- transmitting the data objects generated in relation to the respective received scene source data to at least one remote station (RS), located remotely from the ROI;
- receiving, at the at least one remote station, one or more data objects; and
- generating, based on the received one or more data objects, virtual scene data.

Some examples pertain to a system for providing scene related information from a scene including at least one real carrier platform, to a remote station, the system comprising:

- at least one memory configured to store data and program code instructions; and
- at least one processor configured to execute program code instructions stored in the memory for enabling performing the following steps:
- receiving, at the remote station, at least one data object in relation to at least one identified attribute of one or more physical objects located in the scene acquired by at least one sensor, wherein a priority level value (PLV) is associated with the at least one data object;
- displaying, at the remote station, a scene representation comprising a data object visualization of the received at least one data object;
- receiving from the scene at the remote station, after a downlink transmission latency, real-world scene data descriptive of real world ROI/Target information;
- designating, by a user, an ROI/Target of the data object visualization;
- displaying real-world ROI/Target information of, relating to or corresponding to the designated ROI/Target;
- associating, for example, by a user, an updated PLV to the object data in accordance with the displayed real-world ROI/Target information; and
- transmitting an updated data object to the remote station in accordance with the updated PLV. In some examples, the updated data object may be different or identical to the previous data object, optionally depending on the associated PLV.

In some examples, the associating of the updated PLV to the object data is performed by the user at the remote station.

In some examples, the scene representation further includes low-latency information that is based on local data (also: local station data), that may exclude data transmitted from the scene to the remote station.

In some examples, a system for providing scene related information from a scene including at least one real carrier platform, to a remote station, may include:

- at least one memory configured to store data and program code instructions; and
- at least one processor configured to execute program code instructions stored in the memory for enabling performing the following steps:
- generating, at the remote station, using local station data, a low-latency virtual representation of the scene;
- displaying, at the remote station, a scene representation comprising the low-latency scene representation. The scene representation may be partially or fully based on the local station data.

In some examples, the steps may further include receiving from the scene at the remote station, after a downlink transmission latency, real-world scene data descriptive of real world ROI/Target information;

- designating, by the user, an ROI/target displayed by the low-latency scene representation;
- displaying real-world ROI/Target information of the designated ROI/Target;
- associating a PLV to real-world scene data descriptive of the real-world ROI/Target information; and
- transmitting a data object to the remote station in accordance with the associated PLV, the data object relating to one or more physical objects located in an ROI of the scene acquired by at least one sensor.

In some examples, associating of the updated PLV to the object data is performed by a user at the remote station.

In some examples, the data object may be displayed at the remote station (e.g., as a visualized data object). In some examples, a visualized or displayed data object may be selected by the user for providing a real-world representation thereof (e.g., display of acquired video feed of the designated data object) and, optionally, for associating therewith an updated PLV, e.g., as described herein.

In some examples, real world ROI/Target information relating to a designated ROI/Target is displayed in one of the following display modes: in overlay to or instead of the corresponding portion of the displayed scene representation; and/or side-by-side to the displayed scene representation.

In some examples, selection of an ROI/target may be made by the user by designating a preview window in the displayed scene representation.

In some examples, a method for providing scene related information from a scene including at least one real carrier platform comprises:

receiving, at the remote station, at least one data object in relation to at least one identified attribute of one or more physical objects located in the scene acquired by at least one sensor, wherein a priority level value (PLV) is associated with the at least one data object;

displaying, at the remote station, a scene representation comprising a data object visualization of the received at least one data object;

receiving from the scene at the remote station, after a downlink transmission latency, real-world scene data descriptive of real world ROI/Target information;

designating, by a user, an ROI/Target of the data object visualization;

displaying real-world ROI/Target information of the designated ROI/Target;

associating an updated PLV to the object data in accordance with the displayed real-world ROI/Target information; and transmitting an updated data object to the remote station in accordance with the updated PLV.

In some examples, the associating of the updated PLV to the object data is performed by the user at the remote station.

In some examples, the scene representation further includes low-latency information that is based on local data.

In some examples, a system for providing scene related information from a scene including at least one real carrier platform, to a remote station, comprises:

at least one memory configured to store data and program code instructions; and at least one processor configured to execute program code instructions stored in the memory for enabling performing the following steps:

generating, at the remote station, a low-latency representation of the scene;

displaying, at the remote station, the low-latency scene representation;

receiving from the scene at the remote station, after a downlink transmission latency, real-world scene data descriptive of real world as acquired by at least one sensor;

designating, by the user, an ROI/target on the displayed low-latency scene representation;

displaying real-world data as acquired by at least one sensor overlaid on the designated ROI/Target having the corresponding downlink latency display time;

associating a priority level value (PLV) with the designated ROI/target, based on the sensor data overlaid on the ROI/target;

transmitting the PLV of the ROI/target from the remote station to the platform;

transmitting the ROI/target from the sensor to the remote station in accordance with the associated PLV such that the transmitted ROI/target downlink latency is lower than the downlink latency of the real-world scene data descriptive of real world acquired by at least one sensor.

In some examples, the associating of the PLV is performed by the user at the remote station.

In some examples, the low-latency scene representation is based on local data and/or on data objects received from a scene.

In some examples, a method for providing scene related information from a scene including at least one real carrier platform, to a remote station, comprises:

generating, at the remote station, a low-latency representation of the scene;

displaying, at the remote station, the low-latency scene representation;

receiving from the scene at the remote station, after a downlink transmission latency, real-world scene data descriptive of real world as acquired by at least one sensor;

designating, by the user, an ROI/target on the displayed low-latency scene representation;

displaying real-world data as acquired by at least one sensor overlaid on the designated ROI/Target having the corresponding downlink latency display time;

associating a priority level value (PLV) with the designated ROI/target, based on the sensor data overlaid on the ROI/target;

transmitting the PLV of the ROI/target from the remote station to the platform;

transmitting the ROI/target from the sensor to the remote station in accordance with the associated PLV such that the transmitted ROI/target downlink latency is lower than the downlink latency of the real-world scene data descriptive of real world acquired by at least one sensor.

In some examples, the associating of the PLV is performed by the user at the remote station.

In some examples, wherein the low-latency scene representation is based on local data and/or on data objects received from the scene.

It is important to note that the methods described herein and illustrated in the accompanying diagrams shall not be construed in a limiting manner. For example, methods described herein may include additional or even fewer processes or operations in comparison to what is described herein and/or illustrated in the diagrams. In addition, method steps are not necessarily limited to the chronological order as illustrated and described herein.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A,B,C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A,B,C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

"Real-time" as used herein generally refers to the updating of information at essentially the same rate as the data is received. More specifically, in the context of the present invention "real-time" is intended to mean that the image data is acquired, processed, and transmitted from a sensor at a high enough data rate and at a low enough time delay that when the data is displayed, data portions presented and/or displayed in the visualization move smoothly without user-noticeable judder, latency or lag.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A system for providing scene related information from a scene including at least one real carrier platform, to a user at a remote station, the system comprising:

at least one sensor configured to acquire scene information for generating real-world data descriptive of at least one real-world object of the scene;

at least one memory configured to store data and program code instructions; and at least one processor configured to execute program code instructions stored in the memory for enabling performing the following steps:

generating, at the remote station, a synthetic scene representation;

displaying, at the remote station, the synthetic scene representation, wherein the synthetic scene representation comprises one or more synthetic data objects that are descriptive of one or more respective real-world objects;

receiving, at the remote station, a designation of at least one region-of-interest (ROI) of the synthetic scene representation;

performing classification of the one or more synthetic data objects; and based on the classification, adaptively modifying a display of at least one synthetic data object transitioning from outside the ROI into the ROI, to a live video feed of at least one corresponding real-world object.

2. The system of claim 1, further configured to modify the display of the live video feed of the at least one real-world object to display the corresponding at least one synthetic data object if the at least one real-world object moves from within the ROI to outside the ROI.

3. The system of claim 1, wherein the steps further comprise selecting at least one portion of the at least one ROI for displaying the selected at least one portion of the at least one ROI at the remote station at higher resolution compared to a non-selected portion.

4. The system of claim 1, wherein the steps further comprise:

selecting a portion of the at least one ROI for displaying the selected portion of the at least one ROI at the remote station at zero latency compared to a non-selected portion.

5. The system of claim 1, wherein the at least one sensor is accommodated by one more movable platforms.

6. The system of claim 1, further comprising identifying an object type located inside the designated ROI.

7. The system of claim 6, wherein the object type can be one of a moving and non-moving object type.

8. The system of claim 6, wherein the object type can be one of a high-interest and low-interest object type.

9. A method for providing scene related information from a scene including at least one real carrier platform, to a user at a remote station, the method comprising:

acquiring scene information for generating real-world data descriptive of at least one real-world object of the scene;

generating, at the remote station, a synthetic scene representation;

displaying, at the remote station, the synthetic scene representation, wherein the synthetic scene representation comprises one or more synthetic data objects that are descriptive of one or more respective real-world objects located in the scene;

receiving, at the remote station, by the user, a designation of at least one region-of-interest (ROD) of the synthetic scene representation;

performing classification of the one or more data objects located in the ROI; and determining, based on the classification, whether to display in the ROI a live video feed of the one or more respective real-world objects; and adaptively modifying a display of at least one synthetic data object that has transitioned from outside the ROI into the ROI, to a live video feed of at least one corresponding real-world object.

10. The system of claim 1, further configured to modify the display of the live video feed of the at least one real-world object to display the corresponding at least one synthetic data object when the at least one real-world object moved from within the ROI to outside the ROI.

11. The method of claim 9, further comprising:

selecting at least one portion of the at least one ROI for displaying the selected portion of the at least one ROI at the remote station at higher resolution compared to a non-selected portion.

12. The method of claim 9, further comprising:

selecting at least one portion of the at least one ROI for displaying the selected at least one portion of the at least one ROI at the remote station at zero latency compared to a non-selected portion.

13. The method of claim 9, wherein the at least one sensor is accommodated by one more movable platforms.

14. The method of claim 9, further comprising identifying an object type of the designated ROI.

15. The method of claim 14, wherein the object type can be one of a moving and non-moving object type.

16. A system for providing scene related information from a scene including at least one real carrier platform, to a user at a remote station, the system comprising:

at least one sensor configured to acquire scene information for generating real-world data descriptive of at least one real-world object of the scene;

at least one memory configured to store data and program code instructions; and at least one processor configured to execute program code instructions stored in the memory for enabling performing the following steps:

acquiring scene information for generating real-world data descriptive of at least one real-world object of the scene;

generating, at the remote station, a synthetic scene representation;

displaying, at the remote station, the synthetic scene representation, wherein the synthetic scene representation comprises one or more synthetic data objects that are descriptive of one or more respective real-world objects located therein;

receiving, at the remote station, a designation of at least one region-of-interest (ROI) of the synthetic scene representation;

performing classification of the one or more synthetic data objects located in the ROI;

associating, based on the classification, a priority level value (PLV) with the one or more synthetic data objects of the ROI; and if a PLV associated with at least one synthetic data object of the ROI exceeds a low threshold value:

transmitting corresponding real-world data from the sensor to the remote station; and displaying, in the ROI, a live video feed of the at least one real-world object represented by the at least one synthetic data object.

17. The system of claim 16, further configured to modify the display of the live video feed of the at least one real-world object to display the corresponding at least one synthetic data object if the at least one real-world object moves from within the ROI to outside the ROI.

* * * * *